United States Patent
Goel et al.

(10) Patent No.: US 10,102,238 B2
(45) Date of Patent: *Oct. 16, 2018

(54) MULTI-USER SEARCH SYSTEM USING TOKENS

(71) Applicant: Dropbox, Inc., San Francisco, CA (US)

(72) Inventors: Samir Goel, San Francisco, CA (US); Franck Chastagnol, Woodside, CA (US); Abhishek Agrawal, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/275,238

(22) Filed: Sep. 23, 2016

(65) Prior Publication Data

US 2017/0011084 A1 Jan. 12, 2017

Related U.S. Application Data

(63) Continuation of application No. 14/555,140, filed on Nov. 26, 2014, now Pat. No. 9,514,123.
(Continued)

(51) Int. Cl.
*G06F 17/30* (2006.01)
*G06F 17/27* (2006.01)
(Continued)

(52) U.S. Cl.
CPC ...... *G06F 17/30356* (2013.01); *G06F 17/277* (2013.01); *G06F 17/30011* (2013.01);
(Continued)

(58) Field of Classification Search
CPC ............. G06F 17/277; G06F 17/30312; G06F 17/30356; G06F 17/30309; G06F 17/30368; G06F 17/30616
See application file for complete search history.

(56) References Cited

U.S. PATENT DOCUMENTS 6,067,541 A * 5/2000 Raju ................. G06F 17/30067
6,151,643 A 11/2000 Cheng
(Continued)

FOREIGN PATENT DOCUMENTS

JP 2003162441 A 6/2003
KR 10-2004-0039691 5/2004
(Continued)

OTHER PUBLICATIONS

Goel, U.S. Appl. No. 14/555,147, filed Nov. 26, 2014, Office Action, dated Jul. 13, 2017.
(Continued)

*Primary Examiner* — Tarek Chbouki
(74) *Attorney, Agent, or Firm* — Hickman Palermo Becker Bingham LLP; Adam C. Stone

(57) ABSTRACT

A multi-user search system with methodology for instant indexing. In one embodiment, for example, a system for instant indexing includes a token store storing sets of tokens for current versions of documents. The system further includes a tokenizer server configured to tokenize new versions of the documents and to generate sets of tokens for the new versions of the documents, an instant indexer configured to determine tokens to use to index the documents based on identified differences between the sets of tokens for the new versions of the documents and the sets of tokens for the current versions of the documents, and to generate index mutations including the tokens to use to index the documents, an index mutation journal configured to store the generated index mutations in association with timestamps, and an index mutation server configured to provide, to index servers, from the index mutation journal, generated index mutations for the index servers that are associated with timestamps that are newer than specified timestamps.

20 Claims, 16 Drawing Sheets

Related U.S. Application Data

(60) Provisional application No. 62/040,382, filed on Aug. 21, 2014.

(51) Int. Cl.
*H04L 29/06* (2006.01)
*G06F 21/62* (2013.01)

(52) U.S. Cl.
CPC .. *G06F 17/30094* (2013.01); *G06F 17/30106* (2013.01); *G06F 17/30309* (2013.01); *G06F 17/30312* (2013.01); *G06F 17/30321* (2013.01); *G06F 17/30368* (2013.01); *G06F 17/30386* (2013.01); *G06F 17/30507* (2013.01); *G06F 17/30616* (2013.01); *G06F 17/30622* (2013.01); *G06F 17/30631* (2013.01); *G06F 17/30867* (2013.01); *G06F 17/30914* (2013.01); *G06F 21/6218* (2013.01); *H04L 63/08* (2013.01); *H04L 63/101* (2013.01)

(56) References Cited

U.S. PATENT DOCUMENTS

| | | | |
|---|---|---|---|
| 6,389,412 B1 | 5/2002 | Light | |
| 6,751,603 B1 | 6/2004 | Bauer et al. | |
| 7,194,487 B1* | 3/2007 | Kekre | G06F 11/2064 |
| 7,437,353 B2 | 10/2008 | Marmaros et al. | |
| 7,508,419 B2 | 3/2009 | Toyama et al. | |
| 7,634,517 B1 | 12/2009 | Burrows et al. | |
| 7,693,813 B1 | 4/2010 | Cao | |
| 7,702,614 B1 | 4/2010 | Shah | |
| 8,005,919 B2 | 8/2011 | Mehanna | |
| 8,126,895 B2 | 2/2012 | Sargent et al. | |
| 8,510,657 B2 | 8/2013 | Gilbert et al. | |
| 8,620,923 B1 | 12/2013 | Wormley | |
| 8,682,901 B1 | 3/2014 | Cao et al. | |
| 8,756,215 B2 | 6/2014 | Shikha | |
| 8,825,602 B1* | 9/2014 | Desai | G06F 17/30174 707/646 |
| 8,868,677 B2 | 10/2014 | Molaro et al. | |
| 2002/0078134 A1 | 6/2002 | Stone | |
| 2004/0064512 A1 | 4/2004 | Arora | |
| 2004/0064568 A1 | 4/2004 | Arora | |
| 2004/0070678 A1* | 4/2004 | Toyama | G06F 17/30265 348/231.3 |
| 2004/0078370 A1* | 4/2004 | Acree | G06F 17/30575 |
| 2004/0083091 A1 | 4/2004 | Le et al. | |
| 2004/0225963 A1 | 11/2004 | Agalwal | |
| 2004/0230903 A1 | 11/2004 | Elza | |
| 2005/0028082 A1 | 2/2005 | Topalov et al. | |
| 2005/0055364 A1 | 3/2005 | Frieder | |
| 2005/0165838 A1 | 7/2005 | Fontoura | |
| 2006/0031198 A1 | 2/2006 | Newbold et al. | |
| 2007/0043750 A1 | 2/2007 | Dingle | |
| 2008/0005184 A1 | 1/2008 | Myllyla et al. | |
| 2008/0243788 A1 | 10/2008 | Reztlaff et al. | |
| 2008/0250021 A1 | 10/2008 | Boys et al. | |
| 2008/0271156 A1 | 10/2008 | Lipinski | |
| 2008/0294674 A1 | 11/2008 | Reztlaff et al. | |
| 2008/0313198 A1 | 12/2008 | Kim et al. | |
| 2009/0063448 A1 | 3/2009 | Depue et al. | |
| 2009/0083268 A1* | 3/2009 | Coqueret | G06F 8/71 |
| 2009/0089323 A1* | 4/2009 | Yoshihama | G06F 17/30011 |
| 2009/0097651 A1 | 4/2009 | Whillock | |
| 2009/0164437 A1 | 6/2009 | Torbjornsen | |
| 2009/0228528 A1 | 9/2009 | Ercegovac et al. | |
| 2009/0274158 A1 | 11/2009 | Sharp | |
| 2009/0276401 A1 | 11/2009 | Groble et al. | |
| 2009/0313503 A1* | 12/2009 | Atluri | G06F 11/1453 714/19 |
| 2010/0161617 A1 | 6/2010 | Cao et al. | |
| 2010/0174709 A1 | 7/2010 | Hansen et al. | |
| 2010/0306191 A1 | 12/2010 | Lebeau et al. | |
| 2011/0029504 A1 | 2/2011 | King | |
| 2011/0191767 A1 | 8/2011 | Pinsky | |
| 2011/0202541 A1 | 8/2011 | Permandla et al. | |
| 2011/0225627 A1 | 9/2011 | Uchida et al. | |
| 2011/0258198 A1 | 10/2011 | Sun et al. | |
| 2012/0131009 A1 | 5/2012 | Nath et al. | |
| 2012/0150796 A1 | 6/2012 | Martick | |
| 2012/0150864 A1 | 6/2012 | Palakodety et al. | |
| 2012/0215785 A1 | 8/2012 | Singh | |
| 2012/0233209 A1 | 9/2012 | Cheng et al. | |
| 2013/0018916 A1 | 1/2013 | Busch | |
| 2013/0138658 A1 | 5/2013 | Flick | |
| 2013/0185439 A1 | 7/2013 | Velasco | |
| 2013/0191414 A1 | 7/2013 | Srivastava et al. | |
| 2013/0226871 A1* | 8/2013 | Sarnowski | G06F 17/30115 707/637 |
| 2013/0275548 A1 | 10/2013 | Molaro et al. | |
| 2013/0332575 A1 | 12/2013 | Song | |
| 2014/0019405 A1 | 1/2014 | Borthakur et al. | |
| 2014/0032703 A1 | 1/2014 | Wormley | |
| 2014/0058732 A1 | 2/2014 | Labsky | |
| 2014/0095467 A1 | 4/2014 | Bueche | |
| 2014/0129712 A1 | 5/2014 | Sharp | |
| 2014/0136543 A1 | 5/2014 | Frieden et al. | |
| 2014/0156669 A1 | 6/2014 | Bati et al. | |
| 2014/0229426 A1* | 8/2014 | Gootee, III | G06F 17/5004 707/608 |
| 2014/0379661 A1 | 12/2014 | Marcus et al. | |
| 2015/0112996 A1 | 4/2015 | Mishra | |
| 2015/0193399 A1 | 7/2015 | Woker | |
| 2015/0281401 A1 | 10/2015 | Le | |
| 2016/0055188 A1 | 2/2016 | Goel et al. | |
| 2016/0224677 A1 | 8/2016 | Goel | |
| 2016/0275197 A1 | 9/2016 | Goel et al. | |

FOREIGN PATENT DOCUMENTS

| | | |
|---|---|---|
| KR | 10-2004-0077918 | 9/2004 |
| KR | 10-2006-0116042 | 11/2006 |
| KR | 10-2007-0051569 | 5/2007 |
| WO | WO 03/079270 A1 | 9/2003 |
| WO | WO2005/114470 A1 | 12/2005 |

OTHER PUBLICATIONS

Goel, U.S. Appl. No. 15/169,437, filed May 31, 2016, Interview Summary, dated Jun. 29, 2017.
Goel, U.S. Appl. No. 15/169,437, filed May 31, 2016, Final Office Action, dated May 31, 2017.
Goel, U.S. Appl. No. 14/856,295, filed Sep. 16, 2015, Office Action, dated Jun. 30, 2017.
Goel, U.S. Appl. No. 14/555,180, filed Nov. 26, 2014, Notice of Allowance, dated Jun. 15, 2017.
Goel, U.S. Appl. No. 15/169,437, filed May 31, 2016, Advisory Action, dated Jul. 17, 2017.
Goel, U.S. Appl. No. 14/555,171, filed Nov. 26, 2014, Office Action, dated Jul. 21, 2017.
U.S. Appl. No. 15/169,437, filed May 31, 2016, Office Action, dated Jan. 10, 2017.
U.S. Appl. No. 14/555,180, filed Nov. 26, 2014, Office Action, dated Dec. 1, 2016.
U.S. Appl. No. 14/856,295, filed Sep. 16, 2015, Final Office Action, dated Dec. 21, 2016.
U.S. Appl. No. 14/609,937, filed Jan. 30, 2015.
U.S. Appl. No. 14/609,930, filed Jan. 30, 2015.
U.S. Appl. No. 14/856,295, filed Sep. 16, 2015, Office Action, dated Jul. 15, 2016.
U.S. Appl. No. 14/609,937, filed Jan. 30, 2015, Office Action, dated Nov. 9, 2015.
U.S. Appl. No. 14/609,937, filed Jan. 30, 2015, Office Action, dated Mar. 19, 2015.
U.S. Appl. No. 14/609,937, filed Jan. 30, 2015, Notice of Allowance, dated Feb. 24, 2016.
U.S. Appl. No. 14/609,937, filed Jan. 30, 2015, Final Office Action, dated Jul. 7, 2015.

(56) References Cited

OTHER PUBLICATIONS

U.S. Appl. No. 14/609,937, filed Jan. 30, 2015, Advisory Action, dated Oct. 6, 2015.
U.S. Appl. No. 14/609,937, filed Jan. 30, 2015, Interview Summary, dated Jun. 11, 2015.
U.S. Appl. No. 14/609,930, filed Jan. 30, 2015, Office Action, dated Apr. 3, 2015.
U.S. Appl. No. 14/609,930, filed Jan. 30, 2015, Notice of Allowance, dated Jul. 8, 2015.
U.S. Appl. No. 14/555,140, filed Nov. 26, 2014, Office Action, dated Oct. 1, 2015.
U.S. Appl. No. 14/555,140, filed Nov. 26, 2014, Office Action, dated Mar. 2, 2016.
U.S. Appl. No. 14/555,140, filed Nov. 26, 2014, Office Action, dated Mar. 18, 2015.
U.S. Appl. No. 14/555,140, filed Nov. 26, 2014, Notice of Allowance, dated Jul. 29, 2016.
U.S. Appl. No. 14/555,140, filed Nov. 26, 2014, Interview Summary, dated Nov. 19, 2015.
U.S. Appl. No. 14/555,140, filed Nov. 26, 2014, Final Office Action, dated Jul. 7, 2015.
Goel, U.S. Appl. No. 14/856,295, filed Sep. 16, 2015, Notice of Allowance, dated Dec. 12, 2017.
Goel, U.S. Appl. No. 15/169,437, filed May 31, 2016, Appeal Brief, dated Sep. 29, 2017.
Goel, U.S. Appl. No. 15/169,437, filed May 31, 2016, Examiners Answers, dated Feb. 2, 2018.
Korean Patent Office, "Search Report" in application No. 10-2017-7004799, dated May 15, 2017, 3 pages.
Claims in Korean Application No. 10-2017-7004799, dated Mar. 2017, 7 pages.
Parker-Wood et al., "Security Aware Partitioning for Efficient File System Search", IEEE, dated 2010, Mass Storage Technologies, 14 pages.
International Searching Authority, "Search Report" in application No. PCT/US2015/015575, dated May 10, 2016, 11 pages.
International Searching Authority, "Search Report" in application No. PCT/US2015/030476, dated Aug. 19, 2015, 11 pages.
International Searching Authority, "Search Report" in application No. PCT/US2015/030474, dated Aug. 19, 2015, 8 pages.
European Patent Office, "Search Report" in application No. PCT/US2015/030474, dated Nov. 20, 2015, 21 pages.
European Claims in application No. PCT/US2015/030476, dated Aug. 2015, 9 pages.
European Claims in application No. PCT/US2015/030474, dated Nov. 2015, 10 pages.
Current Claims in application No. PCT/US2015/015575, dated May 2010, 6 pages.
Claims in application No. PCT/US2015/030476, dated Aug. 2015, 9 pages.
Claims in application No. PCT/US2015/030474, dated Aug. 2015, 10 pages.
Concise explanation of the Korean language search report, in application No. 10-2017-7004799, dated Mar. 7, 2017, 1 page.

* cited by examiner

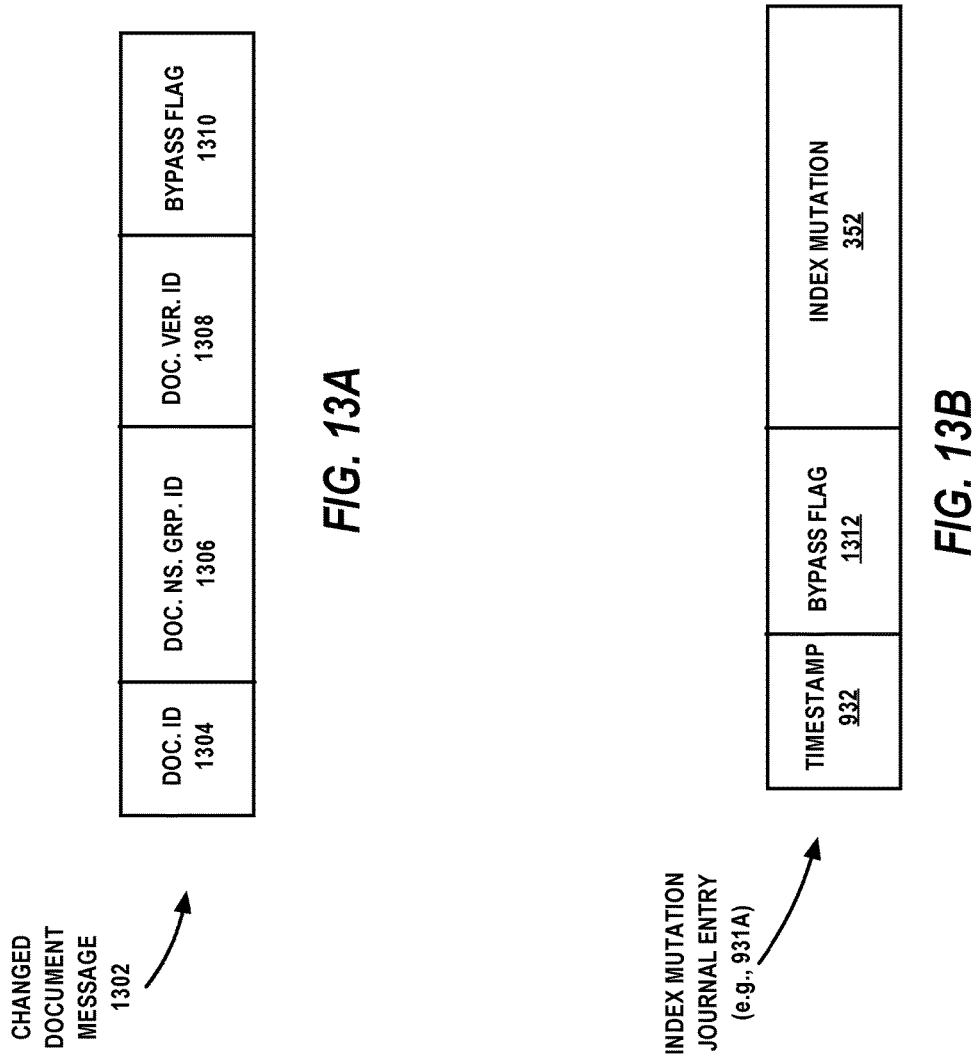

MULTI-USER SEARCH SYSTEM USING TOKENS

RELATED APPLICATIONS

This application is a continuation of U.S. application Ser. No. 14/555,140, "Multi-User Search System with Methodology for Instant Indexing," filed Nov. 26, 2014, which claims the benefit under 35 U.S.C. 119(e) of U.S. Provisional Patent Application No. 62/040,382, "Multi-User Search System with Methodologies for Personal Searching," filed Aug. 21, 2014, the contents of which are hereby incorporated by reference as if fully set forth herein.

This application is related to the following applications: (1) U.S. patent application Ser. No. 14/555,147, "Multi-User Search System with Methodology for Personal Searching," filed on Nov. 26, 2014; and (2) U.S. patent application Ser. No. 14/555,171, "Multi-User Search System with Methodology for Personalized Search Query Autocomplete," filed on Nov. 26, 2014. Both of these applications are hereby incorporated by reference in their entirety, for all purposes.

TECHNICAL FIELD

The disclosed technologies relate generally to information retrieval computer systems and, more particularly, to a multi-user search system having a methodology for instant indexing.

BACKGROUND

Computers are very powerful tools for searching for relevant information among a vast amount of information. Indexes are a common mechanism for efficiently identifying information of interest among a large corpus of information using a computer. A typical index is an organized mapping of keywords to the documents of information from which the keywords were extracted or derived. As an example, an index of the world's publically accessible web pages may map words in the web pages to the subset of the web pages that contain that word.

Between the actual physical index itself (e.g., the index data as stored on one or more computers) and the users of the system, a search system is typically provided as a software cushion or layer. In essence, the search system shields the user from knowing or even caring about underlying index details. Typically, all requests from users for information in the index are processed by the search system. For example, documents relevant to a user's request for information may be identified by the search system using an index, all without user knowledge of the underlying index implementation. In this manner, the search system provides users access to relevant information without concern to how the information is indexed or accessed. One well-known search system for identifying relevant information among the world's publically accessible web pages is the GOOGLE Internet search engine provided by Google Inc. of Mountain View, Calif.

One function of a search system is answer to search queries (or just "queries" for short). A query may be defined as a logical expression including a set of one or more search terms, and results in the identification of a subset of indexed documents. Consider, for instance, the handling of a request for information from an Internet search engine. In operation, this request is typically issued by a client system as one or more Hyper Text Transfer Protocol or "HTTP" requests for retrieving particular search results (e.g., a list of all Internet web pages containing the words "college" and "basketball") from indexes on server computers. In response to this request, the search system typically returns a web page containing hyperlinks to those Internet web pages considered to be most relevant to the search terms "college" and "basketball".

Internet search engines are well-suited for searching all the world's information that is publically available on the Internet. Recently, however, users are beginning to amass a substantial amount of "personal" digital information that is not publically accessible on the Internet or indexed by an Internet search engine. Such information can include, for example, personal digital photos, school, and work documents among other personal and private digital information. In some instances, a user's personal digital information is shared with a defined group of users. For example, an employee may share work documents with other colleagues or a user may share digital photos with friends and family.

One way users have recently begun storing and managing all their personal digital information is by using a cloud data storage service. Such services allows users to upload and store their personal digital information on server computers accessible on the Internet or other network from their various end-user computing devices. In some instances, the service may synchronize information between end-user computing devices and service server computers to facilitate user access to information locally at the end-user computing devices. One well-known cloud data storage service is the DROPBOX content management service provided by Dropbox, Inc. of San Francisco, Calif.

Users of cloud data storage services would appreciate ways to search for and locate their personal digital information hosted by such services. Such personal digital information is typically not publically accessible on the Internet. For this and other reasons, Internet search engines are generally not adequate to meet the search needs of these users.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

FIG. 13A is a block diagram of a changed document message according to some embodiments of the present invention.

FIG. 13B is a block diagram of an index mutation journal entry according to some embodiments of the present invention.

DETAILED DESCRIPTION

Figure 1:
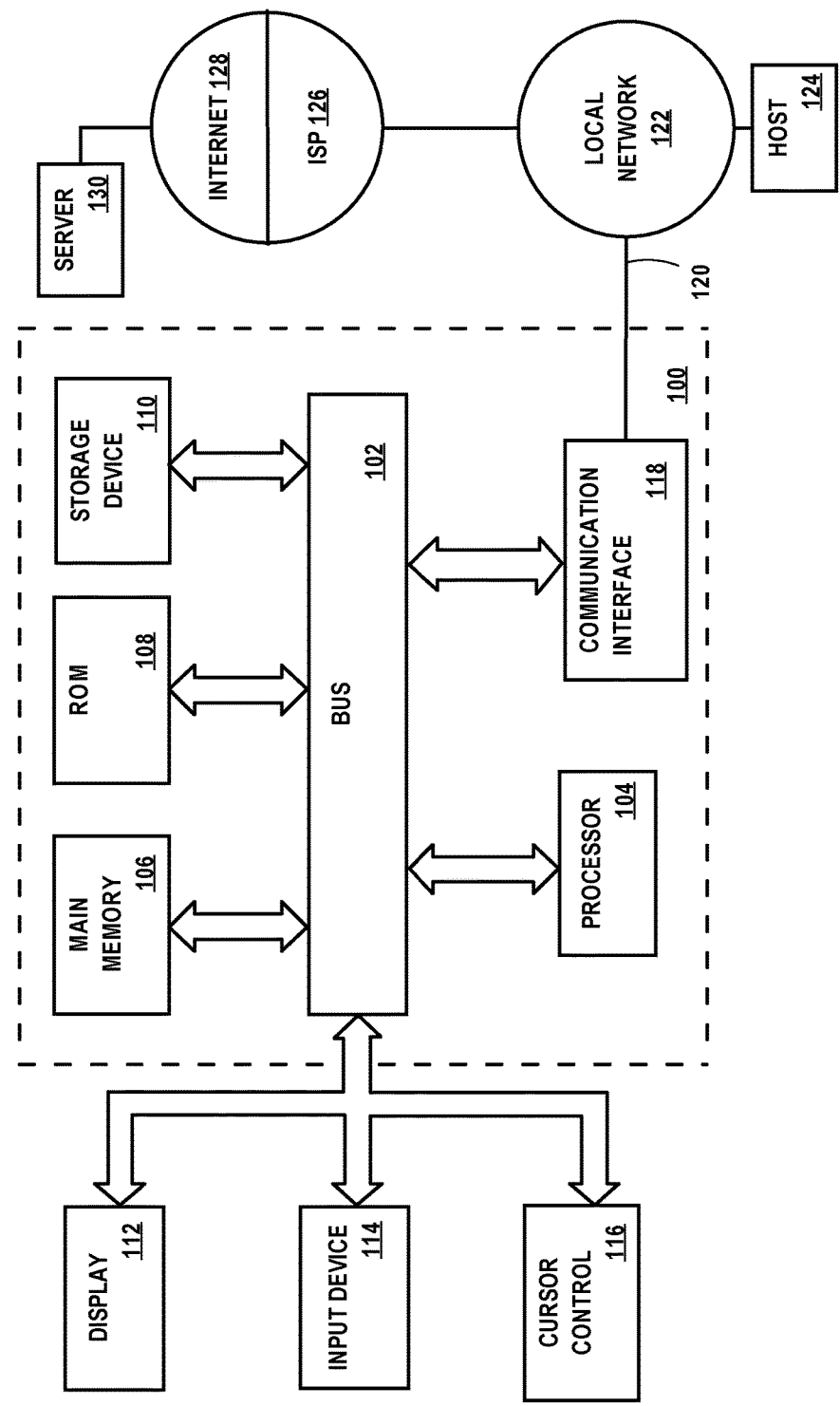
FIG. 1 is a block diagram of a basic computing device in accordance with some embodiments of the invention.

In the following description, for the purposes of explanation, numerous specific details are set forth in order to provide a thorough understanding of the disclosed technologies. It will be apparent, however, that the disclosed technologies can be practiced without these specific details. In other instances, well-known structures and devices are shown in block diagram form in order to avoid unnecessarily obscuring the disclosed technologies. As to the flowcharts, a block within the flowcharts may represent both a method step and an apparatus element for performing the method step. Depending upon the requirements of the particular implementation at hand, the corresponding apparatus element may be configured in hardware, software, firmware or combinations thereof.

It will also be understood that, although the terms "first", "second", etc. may be used herein to describe various elements, these elements should not be limited by these terms. These terms are only used to distinguish one element from another. For example, a first device could be termed a second device, and, similarly, a second device could be termed a first device, without departing from the scope of the invention. The first device and the second device are both devices, but they are not the same device.

The terminology used herein is for the purpose of describing particular implementations only and is not intended to be limiting of the claims. As used in this description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising", when used in this specification, specify the presence of stated features, integers, steps, operations, elements, and/or components, but do not preclude the presence or addition of one or more other features, integers, steps, operations, elements, components, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Overview

A multi-user computer search system with methodology for instant indexing of documents is disclosed. The documents may include, for instance, documents that have been recently created or recently modified by users. Various embodiments, among other aspects, allow users to perform full-text and filename searching of documents soon (e.g., within minutes) after the documents are created or modified.

Various embodiments of the invention, among other aspects, facilitate full-text and filename searching of users' personal documents in a multi-user computer search system where new documents are created and existing documents are updated from time-to-time.

Various embodiments of the invention, among other aspects, effect an improvement in the technical field of information retrieval using computers.

Various embodiments of the invention, among other aspects, improve multi-user cloud data storage services provided by cloud data storage service providers.

Various embodiments of the invention, among other aspects, improve the functioning of multi-user computer search systems.

According to one embodiment, a token store stores sets of tokens for current versions of documents. A method for instant indexing includes tokenizing new versions of the documents and generating sets of tokens for the new versions of the documents. The method further includes identifying differences between the sets of tokens for the new versions of the documents and the sets of tokens for the current versions of the documents, determining tokens to use to index the documents based on the identified differences, generating index mutations including the tokens to use to index the documents, storing the generated index mutations in association with timestamps, and providing, to index servers, generated index mutations for the index servers that are associated with timestamps that are newer than specified timestamps.

In one aspect, the method further includes determining tokens to no longer use to index the documents based on identified differences between the sets of tokens for the new versions of the documents and the sets of tokens for the current versions of the documents, and generating index mutations including the tokens to no longer use to index the documents.

In another aspect, the method further includes receiving the specified timestamps in network requests sent from the index servers.

In yet another aspect, the method further includes appending the generated index mutations to a distributed commit log.

In yet another aspect, the method further includes placing a message in a message queue responsive to tokenizing and generating a set of tokens for a new version of a document of the documents. The message includes an identifier of the document. The method further includes de-queuing the message from the message queue, and processing the de-queued message.

In yet another aspect, the method further includes determining the timestamps to associate with the generated index mutations.

In yet another aspect, the method further includes storing the generated sets of tokens for the new versions of the documents in a token store.

In yet another aspect, the method further includes updating in-memory delta indexes at the index servers based on the generated index mutations.

In yet another aspect, the method further includes the index servers periodically polling for new index mutations.

In other aspects, the present invention encompasses a computer system and a computer-readable medium configured to carry out the foregoing steps.

Basic Computer System Hardware and Software

The disclosed technologies may be implemented on one or more computing devices. Such a computing device may be implemented in various forms including, but not limited to, a client, a server computer, a network device, a mobile device, a cell phone, a smart phone, a laptop computer, a desktop computer, a workstation computer, a personal digital assistant, a blade server computer, a mainframe computer, and other types of computers. The computing device described below and its components, including their connections, relationships, and functions, is meant to be exemplary only, and not meant to limit implementations of the disclosed technologies described in this specification. Other computing devices suitable for implementing the disclosed technologies may have different components, including components with different connections, relationships, and functions.

Basic Computing Device

Turning now to FIG. 1, it is a block diagram of a basic computing device 100 suitable for implementing the disclosed technologies in accordance with some embodiments of the invention. Computing device 100 includes bus 102 or other communication mechanism for addressing main memory 106 and for transferring data between and among the various components of device 100. Computing device 100 also includes hardware processor 104 coupled with bus 102 for processing information. Hardware processor 104 may be a general purpose microprocessor, a system on a chip (SoC), or other processor suitable for implementing the described technologies.

Main memory 106, such as a random access memory (RAM) or other dynamic storage device, is coupled to bus 102 for storing information and instructions to be executed by processor 104. Main memory 106 also may be used for storing temporary variables or other intermediate information during execution of instructions to be executed by processor 104. Such instructions, when stored in non-transitory storage media accessible to processor 104, render computing device 100 into a special-purpose computing device that is customized to perform the operations specified in the instructions.

Computing device 100 further includes read only memory (ROM) 108 or other static storage device coupled to bus 102 for storing static information and instructions for processor 104.

Mass storage device 110 is coupled to bus 102 for persistently storing information and instructions on fixed or removable media, such as magnetic, optical, solid-state, magnetic-optical, flash memory, or any other available mass storage technology. The mass storage may be shared on a network, or it may be dedicated mass storage. Typically, mass storage devices 110 (e.g., the main hard disk for the device) stores a body of program and data for directing operation of the computing device, including an operating system, user application programs, driver and other support files, as well as other data files of all sorts.

Computing device 100 may be coupled via bus 102 to display 112, such as a liquid crystal display (LCD) or other electronic visual display, for displaying information to a computer user. Display 112 may also be a touch-sensitive display for communicating touch gesture (e.g., finger or stylus) input to processor 104.

An input device 114, including alphanumeric and other keys, is coupled to bus 102 for communicating information and command selections to processor 104.

Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

Computing device 100 may implement the methods described herein using customized hard-wired logic, one or more application-specific integrated circuits (ASICs), one or more field-programmable gate arrays (FPGAs), firmware, or program logic which, in combination with the computing device, causes or programs computing device 100 to be a special-purpose machine.

Methods disclosed herein may also be performed by computing device 100 in response to processor 104 executing one or more sequences of one or more instructions contained in main memory 106. Such instructions may be read into main memory 106 from another storage medium, such as storage device 110. Execution of the sequences of instructions contained in main memory 106 causes processor 104 to perform the process steps described herein. In alternative embodiments, hard-wired circuitry may be used in place of or in combination with software instructions.

The term "storage media" as used herein refers to any non-transitory media that store data and/or instructions that cause a computing device to operate in a specific fashion. Such storage media may comprise non-volatile media and/or volatile media. Non-volatile media includes, for example, optical disks, magnetic disks, or solid-state drives, such as storage device 110. Volatile media includes dynamic memory, such as main memory 106. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 102. Transmission media can also take the form of acoustic or light waves, such as those generated during radio-wave and infra-red data communications.

Various forms of media may be involved in carrying one or more sequences of one or more instructions to processor 104 for execution. For example, the instructions may initially be carried on a magnetic disk or solid-state drive of a remote computer. The remote computer can load the instructions into its dynamic memory and send the instructions over a telephone line using a modem. A modem local to computing device 100 can receive the data on the telephone line and use an infra-red transmitter to convert the data to an infra-red signal. An infra-red detector can receive the data carried in the infra-red signal and appropriate circuitry can place the data on bus 102. Bus 102 carries the data to main memory 106, from which processor 104 retrieves and executes the instructions. The instructions received by main memory 106 may optionally be stored on storage device 110 either before or after execution by processor 104.

Computing device 100 also includes communication interface 118 coupled to bus 102. Communication interface 118 provides a two-way data communication coupling to wired or wireless network link 120 that is connected to local network 122 (e.g., Ethernet network, Wireless Local Area Network, cellular phone network, Bluetooth wireless network, or the like). Communication interface 118 sends and receives electrical, electromagnetic, or optical signals that carry digital data streams representing various types of information. For example, communication interface 118 may be a wired network interface card, a wireless network interface card with an integrated radio antenna, or a modem (e.g., ISDN, DSL, or cable modem).

Network link 120 typically provide data communication through one or more networks to other data devices. For example, network link 120 may provide a connection through local network 122 to host computer 124 or to data equipment operated by Internet Service Provider (ISP) 126. ISP 126 in turn provides data communication services through the world wide packet data communication network now commonly referred to as the "Internet" 128. Local network 122 and Internet 128 use electrical, electromagnetic or optical signals that carry digital data streams. The signals through the various networks and the signals on network link 120 and through communication interface 118, which carry the digital data to and from computing device 100, are example forms of transmission media.

Computing device 100 can send messages and receive data, including program code, through local network 122, Internet 128, ISP 126, network link 120 and communication interface(s) 118. In the Internet example, server computer 130 might transmit a requested code for an application program through Internet 128, ISP 126, local network 122 and communication interface 118.

The received code may be executed by processor 104 as it is received, and/or stored in storage device 110, or other non-volatile storage for later execution.

Basic Software System

Figure 2:
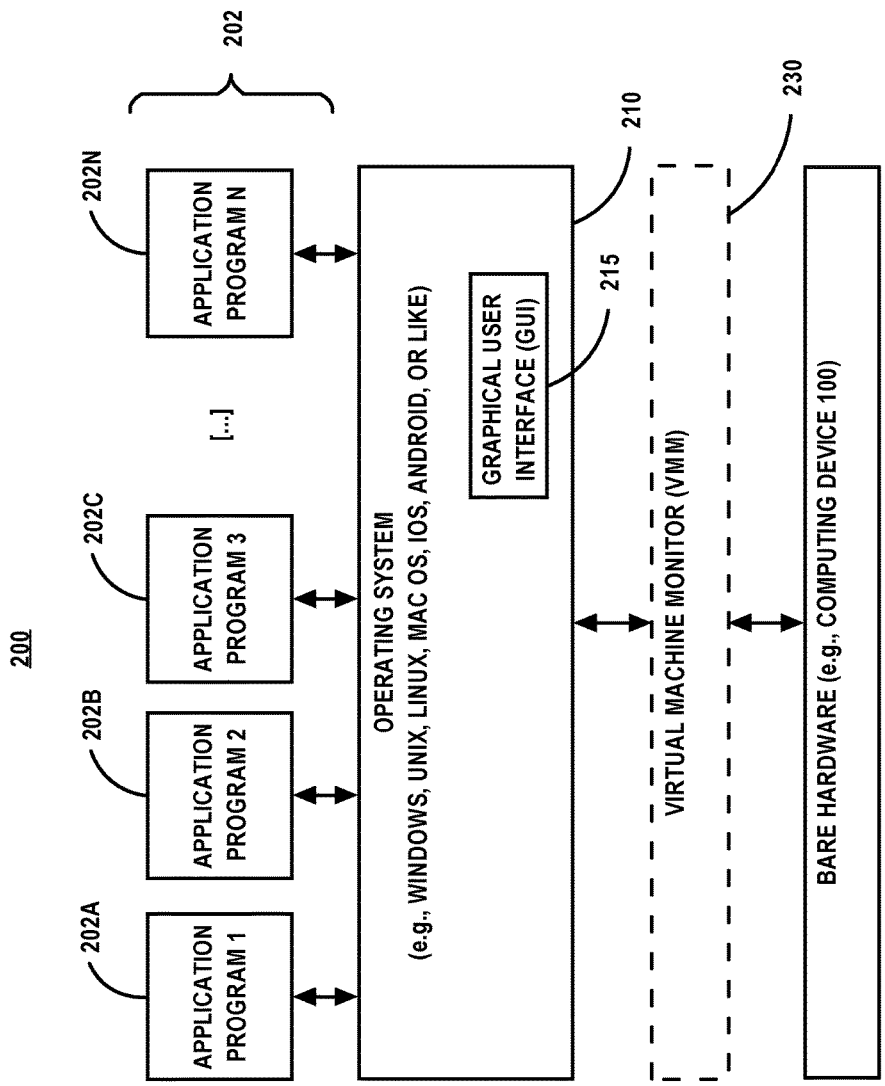
FIG. 2 is a block diagram of a basic software system for controlling the operation of the computing device in accordance with some embodiments of the invention

Turning now to FIG. 2, it is a block diagram of a basic software system 200 for controlling the operation of computing device 100 in accordance with some embodiments of the invention. As shown, computer software system 200 is provided for directing the operation of computing device 100. Software system 200, which is stored in system memory (RAM) 106 and on fixed storage (e.g., hard disk) 110, includes kernel or operating system (OS) 210. OS 210 manages low-level aspects of computer operation, including managing execution of processes, memory allocation, file input and output (I/O), and device I/O. One or more application programs 202 (e.g., 202A, 202B, 202C . . . 202N) may be "loaded" (e.g., transferred from fixed storage 110 into memory 106) for execution by system 200. In some instances, application programs 202 or other software intended for use on device 100 may also be stored as a set of downloadable computer-executable instructions, for example, for downloading and installation from an Internet location (e.g., from a web server).

Software system 200 may include graphical user interface (GUI) 215, for receiving user commands and data in a graphical (e.g., "point-and-click" or "touch gesture") fashion. These inputs, in turn, may be acted upon by system 200 in accordance with instructions from operating system 210 and/or application programs 202. GUI 215 also serves to display the results of operation from OS 210 and application programs 202, whereupon the user may supply additional inputs or terminate the session (e.g., log off).

OS 210 can execute directly on the bare hardware (e.g., processor 104) of device 100. Alternatively, hypervisor or virtual machine monitor (VMM) 230 may be interposed between the bare hardware and OS 210. In this configuration, VMM 230 acts as a software "cushion" or virtualization layer between OS 210 and the bare hardware of device 100.

VMM 230, if present, instantiates and runs virtual machine instances ("guest machines"). Each guest machine includes a "guest" operating system, such as OS 210, and one or more application programs, such as application programs 202, designed to execute on the guest operating system. VMM 230 presents the guest operating systems with a virtual operating platform and manages the execution of the guest operating systems. In some instances, VMM 230 may allow a guest operating system to run as through it is running on the bare hardware of device 100 directly. In these instances, the same version of the guest operating system configured to execute on the bare hardware directly may also be able to execute on VMM 230 without modification or reconfiguration. In other words, VMM 230 may provide full hardware and CPU virtualization to a guest operating system in some instances. In other instances, a guest operating system may be specially designed or configured to execute on VMM 230 for efficiency. In these instances, the guest operating system is "aware" that it executes on a virtual machine monitor. In other words, VMM 230 may provide para-virtualization to a guest operating system in some instances.

The above-described computer hardware and software are presented for purpose of illustrating basic underlying computer components that may be employed for implementing the disclosed technologies. The disclosed technologies, however, are not limited to any particular computing environment or computing device configuration. Instead, the disclosed technologies may be implemented in any type of system architecture or processing environment capable of supporting the disclosed technologies presented in detail below.

Client/Server Multi-User Search System Components

Figure 3:
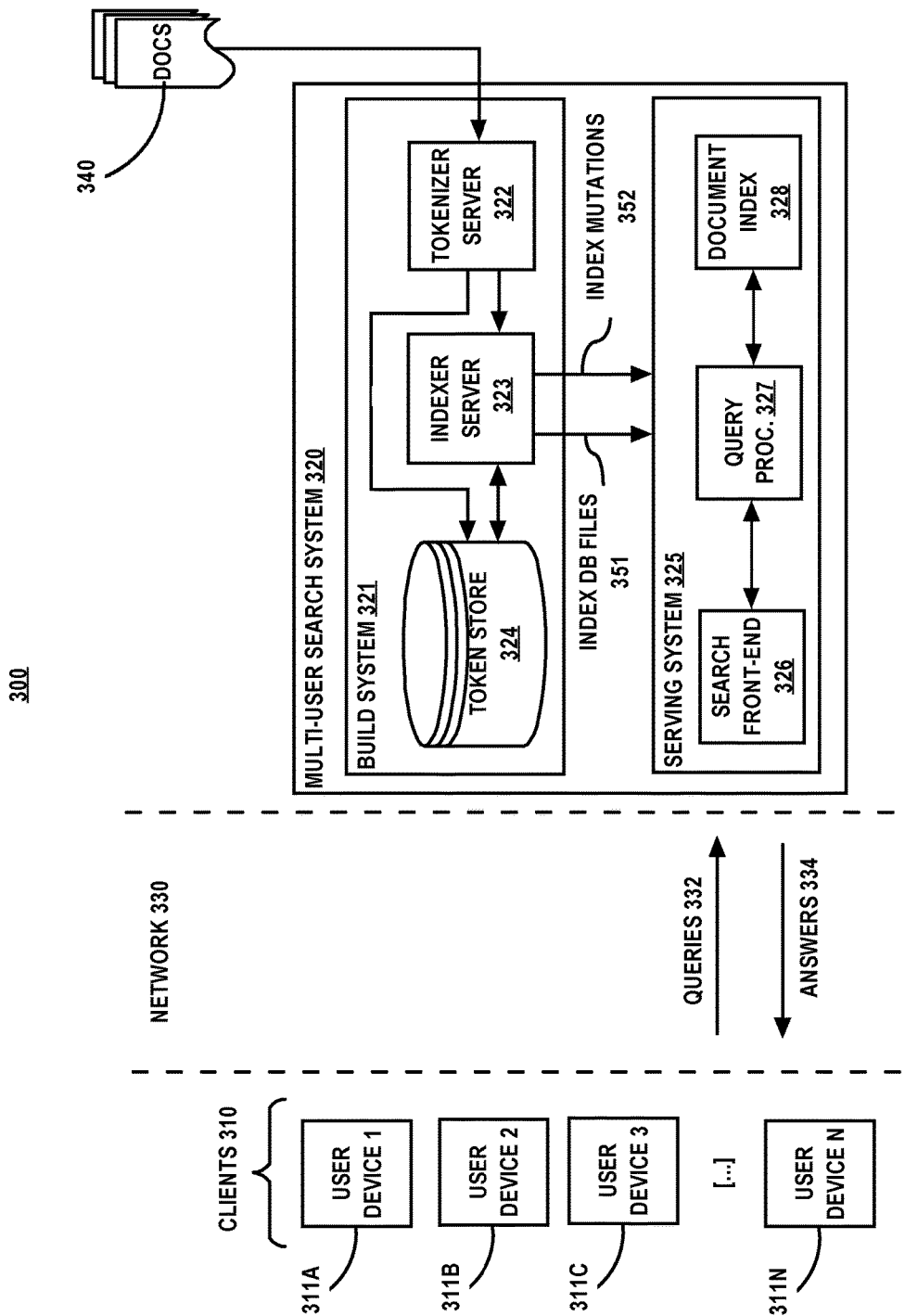
FIG. 3 is a block diagram of a client/server system including a multi-user search system in accordance with some embodiments of the invention.

Turning now to FIG. 3, it is a block diagram of a client/server system 300 in accordance with some embodiments of the invention. The client/server system 300 includes one or more servers 320 (collectively referred to herein as "multi-user search system 320"). Also, client/server system 300 includes one or more clients 310 connected to one or more servers 325 (collectively referred to herein as "serving system 325") via network 330. Specifically, clients 310 comprise one or more end-user computing devices 311 connected to one or more servers 326 (collectively referred to herein as "search front-end 326") using a conventional network. In an exemplary embodiment, end-user computing devices 311 may themselves comprise a plurality of end-user personal computing devices such as the above-described device 100 that run a conventional operating system such as MICROSOFT WINDOWS (e.g. XP, VISTA, 7, 8, etc.), MAC OS X, LINUX (e.g., UBUNTU, FEDORA, etc.), IOS, ANDROID, BLACKBERRY OS, and the like.

Serving system 325 and one or more other servers 321 (collectively referred to herein as "build system 321"), which are part of the aforementioned DROPBOX content management service in an exemplary embodiment, generally operate as one or more independent processes (e.g., independent of the clients), running under a server operating system such as UNIX, LINUX, and the like. Build system 321 includes token store 324, indexer server 323 (or just "indexer 323"), and tokenizer 322 (or just "tokenizer 322"). In addition to search front-end 326, serving system 325 also includes query processor 327 and document index 328.

A server of multi-user search system 320, including a server of build system 321 and a server of serving system 325, may be implemented as a server computer (e.g., device 100 of FIG. 1) or as a virtual machine instance depending on the requirements of the particular implementation at hand. Where a server of multi-user search system 320 is implemented as a virtual machine instance there still may be an underlying server computer that hosts (executes) the "virtual" server. However, there is not necessarily a one-to-one correspondence between virtual servers and server computers. For example, a server computer can host multiple virtual servers.

As used in this description and the appended claims, the singular form "server" is intended to include the plural form as well unless the context clearly indicates otherwise. For example, a "server" of multi-user search system 320 may actually be implemented by multiple servers that are mirrors or replicas of each other for load balancing, failover, redundancy, high availability, and/or other purposes according to the requirements of the particular implementation at hand.

In operation, clients 310 send search queries 332 to search front-end 326 and receive query answers 334 thereto from search front-end 326. The queries 332 may be received at search front-end 326 in network requests and the answers 334 sent from search front-end 326 in network responses to the network requests. The network requests and the network responses may be received/sent over network 330 in network data packets. In some embodiments of the invention, the network data packets are formatted in accordance with the Internet Protocol (IP). The network requests and the network responses may also be received/sent in accordance with an application layer networking protocol. In some embodiments, the application layer networking protocol is the Hyper Text Transfer Protocol (HTTP) or the Secure Hyper Text Transfer Protocol (HTTPS). For example, query 332 may be received in one or more HTTP or HTTPS requests and answer 334 sent in one or more HTTP or HTTPS responses thereto.

Network 330 may include a number of conventional wired or wireless network systems including, for instance, a cellular telephone network, a Local Area Network (LAN), a Wide Area Network (WAN), the Internet, and the like. Serving system 325 and build system 321, and the servers thereof, may also be interconnected by one or more IP networks and/or other suitable type of data communications network and may also communicate with each other using HTTP and/or HTTPS and/or other suitable application layer protocol.

A search query 332 may comprise a search expression. The syntax of the search expression may include a sequence of one or more query tokens, possibly related together by one or more Boolean operators (e.g., AND, OR, NOT, etc.). A token may be defined as a sequence of one or more characters. A character in a token may be encoded according to a conventional character encoding scheme (e.g., ASCII, UTF-8, and the like)

A query token may be defined as a token that appears in a search query 332. For example, consider the simple conjunctive query 332: [baguette fromage] (without the enclosing brackets). A document 340 satisfying this query 332 may contain both the token "baguette" and the token "fromage" without necessarily being next to each other in the document 340 and without the token "baguette" necessarily appearing before the token "fromage" in the document 340. However, a document 340 that contains or is associated with the tokens "baguette" and "fromage" near each other and with the token "baguette" before the token "fromage" may be considered more relevant than other documents 340 satisfying the query 332.

A query answer 334 to a search query 332 returned from search front-end 326 to a client (e.g., end-user computing device 311A) may comprise a list search answer summaries ordered by relevance. Each such summary may correspond to a document 340 identified by query processor 327 in document index 328 satisfying the search query 332. A search answer summary may include, for example, an identifier (e.g., a name, a title, etc.) of the corresponding document, a short description (e.g., a synopsis, abstract, extract, snippet, etc.) of the corresponding document, an interactive hyperlink (e.g., a Uniform Resource Locator (URL)) for downloading, viewing, or taking some other user action on the corresponding document, and possibly other useful information about the corresponding document 340 (e.g., a thumbnail image of the corresponding document). The list of summaries may be presented to a user of the end-user computing device, for example, on a web page in a web browser application executing on the end-user computing device or, for instance, in another graphical user interface of an application (e.g., a mobile application) executing on the end-user computing device.

Search queries 332 received at search front-end 326 may be processed by query processor 327. Query processor 327 may consult document index 328 to identify documents satisfying search queries 332. References to (e.g., hyperlinks to) documents identified by query processor 327 satisfying search queries 332 may be returned in answers 334. A technique in some embodiments of the invention performed by query processor 327 for processing queries 332 may be as described in greater detail below.

In some cases, a search query 332 is a "completion" search query 332. A completion search query 332 may be defined as a search query 332 including a sequence of one or more query tokens one of which is not complete. For example, a completion search query 332 may be submitted to search front-end 326 from an end-user computing device (e.g., 311A) when the user of the end-user computing device is in the middle of (e.g., in the process of) entering (e.g., by typing) one of the query tokens of the completion search query 332. In this case, an answer 334 to the completion query 332 may comprise a list of possible completions to the completion search query 332 that query processor 327 identifies in document index 328 based on the completion query 332.

The query tokens in a completion query 332 which are complete are referred to herein as "complete tokens". A query token in the completion query 332 which is not complete is referred to herein as a "completion token". Thus, a completion query may also be defined as a query 332 that includes a completion token.

A completion query 332 may comprise just a single character or more than one character. For example, in the completion query 332 [p] (without enclosing brackets), there may be no complete tokens and the token "p" may be a completion token. A completion query 332 may instead comprise one or more complete tokens. For example, in the completion query 332 [private se] (without enclosing brackets), the token "private" may be a complete token and the token "se" may be a completion token.

Typically, the last token in the sequence of tokens of a completion query 332 (or the only token if there is only one token in the sequence) is a completion token. Often, this is because the user enters the tokens of the competition query 332 in the same order they appear in the sequence. However, a token other than the last token of a completion query 332 can be a completion token. For example, the user may move the input cursor at his or her end-user computing device (e.g., 311A) to edit a previously entered token. For example, the user may enter the query 332 [solved two problems] (without enclosing brackets) at a first time. Later, the user may move the input cursor to replace the token "two" with "th" to generate the completion query [solved th problems]. In this example completion query 332, the first token "solved" and the last token "problems" may be the complete tokens and the second token "th" may be the completion token.

In some embodiments of the invention, a query 332 is designated as a completion query 332 in a network request including query 332. For example, the network request may indicate that a query token of query 332 is a completion token. Identification of the completion token may be made by software executing at the user's end-user computing device (e.g., 311A). For example, the software may send the network request including query 332 to search front-end 326 as the user is entering (e.g., with a physical keyboard or soft keyboard) the characters of a token of query 332 into a search user interface presented at the user's end-user computing device. In doing so, the software may flag, mark, identify, or otherwise indicate in the network request (e.g., with metadata) that the token the user is entering is a completion token. In some embodiments of the invention, the software executing at the user's end-user computing device is JAVASCRIPT software or other web browser client side scripting language software and the search user interface is presented on a web page displayed in a window of the user's web browser. In some embodiments of the invention, the software executing at the user's end-user computing device is a mobile application or other dedicated software application that drives the search user interface at the user's end-user computing device.

A possible completion to a completion search query 332 may be defined as a search query 332 that is satisfied by at least one document 340 indexed by document index 328 and that completes the completion query 332. For example, the search query 332 [solved two problems] (no enclosing brackets) satisfied by at least one document 340 indexed by document index 328 may be a possible completion to the completion search query 332 [solved two prob] (without enclosing brackets). The list of possible completions to the completion query 332 may be provided in the answer 334 in addition to or instead of a list of search answer summaries of documents 340 that satisfy the completion query 332. A technique in some embodiments of the invention employed by query processor 327 for processing completion queries 332 may be as described in greater detail below.

A query 332 that is not a completion query 332 may sometimes be referred to herein as a "non-completion" query 332 to distinguish the query 332 from a completion query 332. A non-completion query 332 may also be defined as a query 332 that contains only complete tokens and does not contain any completion tokens. When referring to a query 332 generally, reference may be made herein to "query 332" or "search query 332" without the preceding "completion" or "non-completion" qualifier. Unless otherwise clearly apparent in context, description herein pertaining to queries 332 generally pertains to both completion queries 332 and non-completion queries 332.

A document 340 may be defined as a collection of digital information that contains text content (e.g., character data) and/or is associated with text content (e.g., textual metadata). As just some examples, a word processing document 340 often contains text context (e.g., the authored words and sentences of the document), a spreadsheet document 340 may contain text context in the form of words and numbers, and a digital image document 340 (e.g., a digital photograph) may contain text content in its header (e.g., in Exchangeable image file format (Exif)). In addition or alternatively, a digital image document 340 may be associated with text content in the form of textual metadata tags or other text description of the image content. These are just some examples of possible types of documents and other types of documents are within the scope of invention.

In some instances, a document 340 corresponds to a file having a file type. Some types of files that can be documents include, but are not limited to, image files (e.g., .jpg, .tiff, .gif), music files (e.g., .mp3, .aiff, .m4a .wav), movie files (e.g., .mov, .mp4, .m4v), word processing files (e.g., .doc, .docx, .pages), presentation files (e.g., .ppt, .pptx, .key), spreadsheet files (e.g., .xls., .xlsx, .numbers), web page files (e.g., .htm, .html), text files (e.g., .txt), and any other type of file that contains and/or is associated with text.

A document 340 can be associated with text context that is descriptive of the document content. This associated text content is sometimes referred to as "textual metadata" for the document. For example, the filename of a document 340 can be textual metadata for the document 340. As another example, textual metadata for a digital image document may be produced by a computer analysis of the image (e.g., optical character recognition (OCR), facial recognition algorithms, etc.). Other forms of textual metadata for a document 340 can include, for instance, text content about the document 340 obtained from a web page that references the document 340 (e.g., by a hyperlink), mentions the document 340 (e.g., in a social networking post), or discusses the document 340 (e.g., in a blog and/or user comments post). For purposes of this description, textual metadata for a document 340 may be considered to be part of and contained (occurring) in the text content of the document 340.

A document 340 may also have multiple versions, one of which is considered the current version. For example, a user may create and save a first version of a word processing document 340 using a word processing program. Sometime later, the user may modify the first version of the document 340 and save a second version of the document 340 containing the modifications. Alternatively, a document 340 may have only one version at a time which is considered the current version.

Document index 328 may comprise one or more dictionary and postings pairs. The dictionary of a pair may store index tokens, and may also comprise a pointer to a postings list in the postings of the pair for each index token. For example, the pointer may be an address of a location in volatile or non-volatile memory where the postings list is stored.

An index token may be defined as a token by which a document 340 is indexed in document index 328. In addition to index tokens, a dictionary may store token attributes for an index token such as, for example, the document frequency of the token. Token attributes for index tokens may be used by query processor 327 to improve query processing efficiency and search result ranking.

A postings list for an index token may store a list of one or more document identifiers of one or more documents 340 in which the token occurs, and may also store document-token attributes for a document 340 identified in the postings list such as, for instance, the frequency of the token in the document 340, or the position(s) of the token within the document 340. Document-token attributes for documents 340 in postings lists may also be used by query processor 327 to improve query processing efficiency and search result ranking.

When processing a query 332, query processor 327 may locate index tokens in a dictionary of document index 328 based on the query tokens in the query 332. For example, for a query 332 such as [solved two problems] (without the enclosing brackets), query processor 327 may locate the index tokens "solved", "two", and "problems" in the dictionary. Query processor 327 may retrieve postings lists for located index tokens using the pointers associated with the located index tokens in the dictionary. For example, query processor 327 may retrieve (e.g., load into RAM) from a postings of document index 328 associated with the dictionary postings lists for the index tokens "solved", "two", and "problems".

Query processor 327 may merge retrieved postings lists using a merge algorithm to identify documents 340 that satisfy the query 332. For example, assume the postings list retrieved for the index token "solved" identifies documents D2 and D3, the postings list retrieved for the index token "two" identifies document D2, and the postings list retrieved for the index token "problems" identifies documents D2 and D3. Query processor 327 may then merge these three postings lists according to a merge algorithm to identify document D2 as containing all of the located index tokens. Various different merge algorithms may be used for merging postings lists and the invention is not limited to any particular merge algorithm. For example, the merge algorithm may combine multiple postings lists by interleaved advancing of pointers through each of the multiple postings lists.

Query processor 327 is not limited to processing only simple conjunctive queries 332 and query processor 327 may process more complex queries 332. For example, query processor 327 may process the following example types of queries 332: Query A:[(two or three) NOT problems], Query B:[two three problems], Query C:[(two three) problems], and Query D:[(two OR three) (problems OR solutions)]. In each of the foregoing example queries 332 within enclosing brackets [ ], the enclosing brackets [ ] are not part of the query. Query A is equivalent to the query 332 [(two or three) AND NOT problems], Query B is equivalent to the Boolean query 332 [two AND three AND problems], Query C equivalent to the Boolean query 332 [(two AND three) AND problems], and Query D equivalent to the Boolean query 332 [(two OR three) AND (problems OR solutions). In the foregoing example queries 332, AND OR NOT( ) are Boolean operators.

In some embodiments of the invention, document index 328 is horizontally partitioned (e.g., sharded) across a plurality of index severs of serving system 325 in which each of the index servers stores a portion (e.g., a shard) of document index 328. Various different techniques may be used to horizontally partition (e.g., shard) index 328 across the index servers. In some embodiments of the invention, document index 328 is sharded by "document namespace".

A document namespace may be defined as a collection of one or more documents 340 under common access control. The common access control can be based on explicit and/or implicit permissions specifying and/or indicating which user(s) and/or group(s) of users have access to the documents 340 in the document namespace and what access (e.g., one or more of read access, write access, share access, preview access, download access, etc.) the user(s) and/or group(s) of users have on the documents 340 that belong to the document namespace. Explicit permissions may come in the form of, for example, one or more access control lists (ACLs) and/or other data associated with the document namespace (or an identifier thereof) specifying and/or indicating which user(s) and/or group(s) of users have access to the documents 340 in the document namespace and what access the user(s) and/or group(s) have on the documents 340 in the document namespace. One example of an implicit permission may be: a user has access to all documents 340 in a document namespace associated with an account (or an identifier thereof) of the user.

In an exemplary embodiment, a document namespace includes documents 340 associated with a user's account held with a cloud data storage service such as, for example, the aforementioned DROPBOX content management service. By successfully authenticating against the account (e.g., with a valid username/password), a user implicitly has access to the documents 340 in the document namespace associated with the user's account.

In an exemplary embodiment, a document namespace includes documents 340 belonging to a collection of one or more documents 340 that is shared among multiple user accounts held with a cloud data storage service such as, for example, the aforementioned DROPBOX content management service. In some instances, the collection of documents may be referred to as a "shared folder". By successfully authenticating against an account with which the collection of documents is shared with, a user has access to the documents in the shared document namespace.

According to some embodiments of the invention in which document index 328 is sharded by document namespace, each of a plurality of index servers of serving system 325 indexes documents 340 belonging to one or more document namespaces. In some embodiments of the invention, an identifier of a document namespace is used as the shard key to determine an index server that indexes documents 340 in the document namespace. In a non-limiting exemplary embodiment, document index 328 indexes documents in over four-hundred million (400,000,000) document namespaces.

Documents 340 may include any document 340 that is provided or made available for processing by build system 321 or that is indexed in document index 328. Build system 321 constructs index database files 351 of document index 328 from documents 340. Build system 321 also generates index mutations 352 to document index 328 from documents 340.

An index database file 351 may comprise a dictionary and postings pair that together index one or more documents 340. Very generally, the data within an index database file 351 may be structured as a collection of key-value pairs (e.g., an associative array) in which the keys correspond to the index tokens of the dictionary and the values corresponding to the postings lists of the postings. In some embodiments of the invention, an index database file 351 indexes documents 340 in one document namespace. In some embodiments of the invention, to reduce the number of index database files 351 of document index 328, an index database file 351 indexes documents 340 in multiple document namespaces. The multiple document namespaces indexed by an index database file 351 is sometimes referred to herein as a "document namespace group" of document namespaces.

Constructing index database files 351 of document index 328 by build system 321 may involve tokenizer 322 generating sets of tokens by tokenizing documents 340 and storing the generated sets of tokens in token store 324. Indexer 323 may then generate index database files 351 based on the generated sets of tokens. Indexer 323 provides generated index database files 351 to serving system 325 for storage on index servers of serving system 325 as part of document index 328. A technique in some embodiments of the invention implemented by build system 321 for constructing index database files 351 of document index 328 from documents 340 may be as described herein.

Generating index mutations 352 to document index 328 from documents 340 by build system 321 may involve tokenizer 322 notifying indexer 323 after generating a set of tokens from a recently created or recently modified document 340. For example, the document 340 may have been recently created or recently modified by a user of an end-user computing device 311. When notified of a recently created document 340 or when notified of an modified document 340, indexer 323 generates an index mutation 352 for the document based on one or more sets of tokens stored for the document in token store 324. In some instances such as, for instance, when the document has been modified, the generated index mutation 352 reflects the differences between the set of tokens generated for the modified document and a set of tokens generated for a previous version of the document. The generated index mutation 352 may be provided to serving system 325 which then applies it document index 328. A technique in some embodiments of the invention implemented by build system 321 for generating index mutations 352 to document index 328 from recently created and modified documents 340 may be as described herein.

Tokenizer 322 produces sets of tokens by tokenizing the text content of documents 340. Tokenizing the text content of a document may include obtaining a character sequence of the document. Various techniques may be used by tokenizer 322 to obtain the character sequence of the document depending on the format of the document data. For example, the technique or techniques used may include decoding the document depending on the character encoding scheme of the document (e.g., ASCII, Unicode UTF-8, MICROSOFT WORD, ADOBE PDF, etc.) and/or uncompressing the document depending on whether the document is compressed (e.g., by ZIP compression).

Once the character sequence of the document is obtained, tokenizer 322 divides the character sequence into pieces, called tokens, possibly performing linguistic processing on tokens at the same time. Linguistic processing may include, for instance, ignoring certain characters (e.g., punctuation), dropping common words (e.g., stop words), and/or stemming and lemmatization. Linguistic processing may also include token normalization including removing diacritics and accents and/or capitalization/case-folding, and the like.

After tokenizer 322 has generated a set of tokens for a document, tokenizer 322 stores the set of tokens in token store 324. In some instances such as, for example, when tokenizer 322 notifies indexer 323 of a recently created document 340 or notifies indexer 323 of a recently modified document 340, tokenizer 322 may also provide the set of tokens to indexer 323.

Token store 324 stores sets of tokens generated for documents 340 by tokenizer 322. For example, for a given version of a document 340, token store 324 may store the set of tokens generated by tokenizer 322 for that document version.

In some embodiments of the invention, token store 324 includes a column-oriented, distributed database system such as, for example, the APACHE HBASE database system. However, other types of database systems may be used in other embodiments according to the requirements of the particular implemented at hand. For example, a proprietary, a relational, or a stand-alone database system may be used instead of an open source, a column-oriented, or a distributed one.

With the above exemplary client-server multi-user search system 320 in mind, the serving system 325 and components thereof used for processing queries 332 and returning personalized answers 334 thereto will now be described in greater detail.

Serving System

Figure 4:
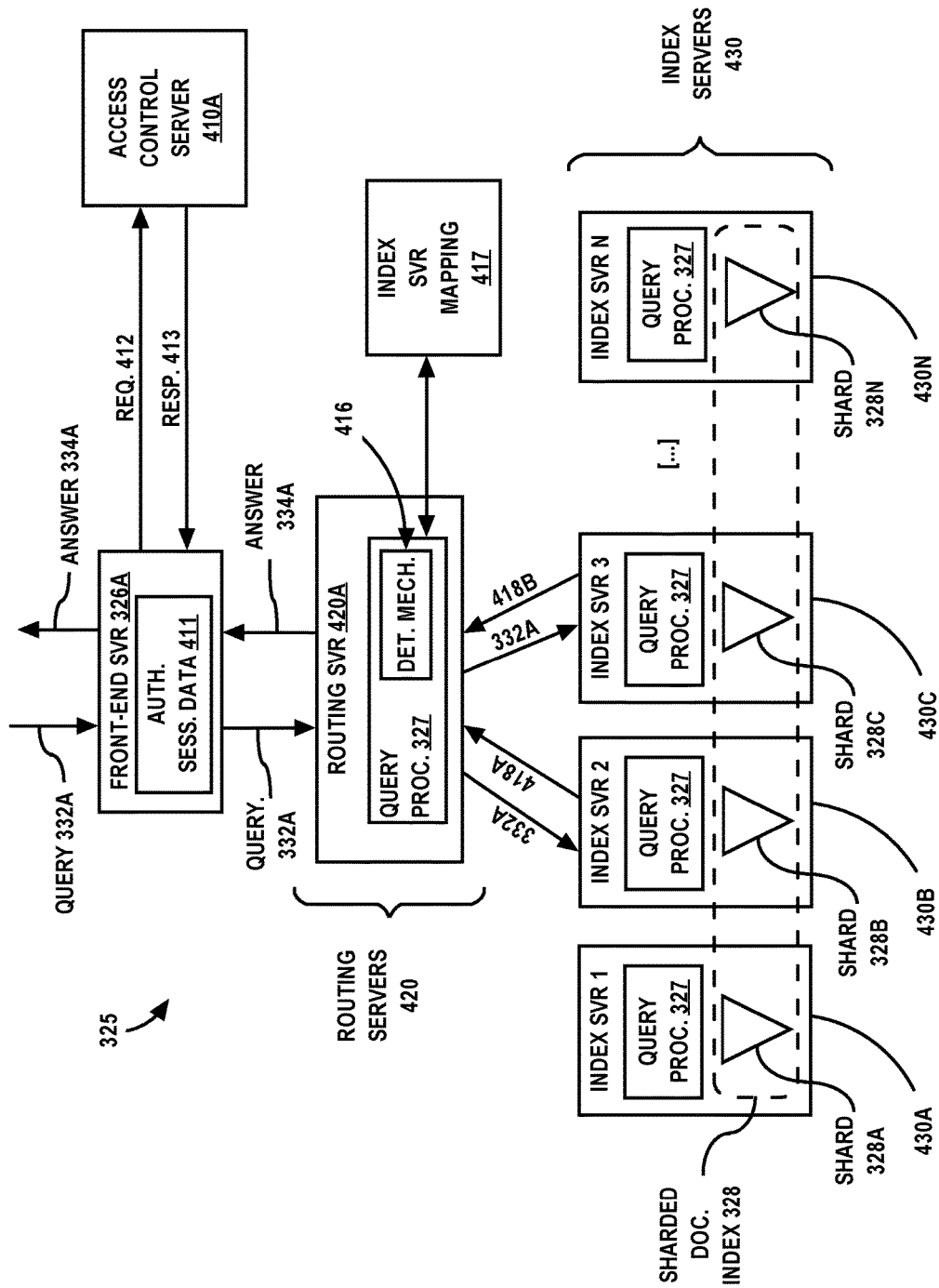
FIG. 4 is a block diagram of a serving system of a multi-user search system in accordance with some embodiments of the invention.

Turning now to FIG. 4, it is a block diagram illustrating components of serving system 325 in greater detail in accordance with some embodiments of the invention. Serving system 325 includes one or more servers 326 (collectively referred to herein as "front-end servers 326"), one or more servers 410 (collectively referred to herein as "access control servers 410"), and query processor 327.

Query processor 327 is distributed over two-levels of servers: (1) one or more servers 430 (collectively referred to as "index servers 430") responsible for storing document index 328 and processing queries 332 against index shards (e.g., 328A, 328B, 328C . . . 328N) of document index 328 and (2) one or more servers 430 (collectively referred to as "routing servers 420") responsible for routing queries 332 from front-end servers 326 to the appropriate index servers 430 based on document namespace identifiers associated with the queries 332 and combining answers 418 returned from index servers 430 into answers 334 that are then returned to the front-end servers 326 and ultimately to the end-user computing devices 311.

Each index shard (e.g., 328A, 328B, 328C . . . 328N) of document index 328 may be stored at a corresponding index server (e.g., 430A, 430B, 430C . . . 430N). An index shard (e.g., 328B) at an index server (430B) may index documents 340 in one or more document namespaces assigned to the index shard.

In operation, front-end server 326A receives a search query 332A from an end-user computing device (e.g., 311A) and returns a personalized answer 334A thereto back to the end-user computing device. The answer 334A may be personalized in the sense that the documents 340 identified in the answer 334 as relevant to the query 332A may be restricted to only documents 340 that belong to a document namespace that the user is authorized to access. If the query 332A is a completion query, then the answer 334A may also be personalized in the sense that the possible completions to the completion query included in the answer 334 may be composed of only index tokens in document index 328 that index documents 340 that belong to a document namespace the user is authorized to access. The user may be authenticated to facilitate the personalization of the answer 334A.

As such, the query 332A may be received at front-end search 326A in the context of an authentication session established for an authenticated user. For example, the authenticated user may be a user of the end-user computing device that sent query 332A to front-end server 326A. The authenticated user may have been authenticated prior to front-end server 326A receiving query 332A. For example, the authenticated user may have been authenticated in response to receiving an authentication network request from the end-user computing device that contained authentication credentials (e.g., a username/password pair). In response to receiving the authentication network request, the password in the network request may be compared to a known password for the given username. If the passwords match, then an authentication session is established. Otherwise, if the passwords do not match, then no authentication session is established.

Authentication credentials other than a username/password pair may be used to authenticate the user. For example, in some instances, the user may be authenticated according to a multi-factor authentication technique. For example, in addition to something that the user knows (e.g., a username/password pair), the user may be authenticated based on something the user has in his or her possession (e.g., a FOB or a mobile phone) and/or based on something the user is (e.g., a biometric measurement). In some instances, the user may be authenticated according to an authentication protocol that does not require the user to provide a password. Some example authentication protocols suitable for this purpose include the Open Authorization (OAuth), the OpenId, and the Security Assertion Markup Language (SAML) authentication protocols.

While in some instances, the user is authenticated prior to front-end server 326A receiving query 332A, the user is authenticated in response to receiving query 332A in other embodiments. For example, the network request containing query 332A may also contain authentication credentials for authenticating the user, or the user can otherwise be authenticated in response to receiving the network request containing the query 332A.

After the user is authenticated, an authentication session may be established for the user in the form of a session identifier token. In particular, the session identifier token may be created in response to successfully authenticating the user. After creation, the session identifier token may be sent (e.g., in a "cookie") between the user's end-user computing device and front-end server 326A in network requests and network responses including in a network request containing query 332A and in a network response containing answer 334A. The session identifier token identifies, directly or indirectly (e.g., through an associative array), a user account that the user successfully authenticated against (e.g., an account uniquely identified by a username). The session identifier token may be cryptographically encrypted for extra security.

From time to time (e.g., in response to receiving query 332A) or over a period of time (e.g., from a time the user is authenticated until the answer 334A is returned to the user's end user computing device), authentication session data 411 may be stored in volatile or non-volatile memory of front-end server 326A. Authentication session data 411 may include information pertaining to the authenticated user such as the authenticated user's username, user identifier, or other user account identifier and associated privileges, permissions, and/or authorizations.

Serving system 325 is capable of restricting the answer 334A to the query 332A to identifying only documents 340 indexed in document index 328 that satisfy the query 332A and that belong to a document namespace that the authenticated user is authorized to access. Serving system 325 is able to do this restricting even though document index 328 may index documents 340 that satisfy the query 332A but that belong to a document namespace that the authenticated user is not authorized to access.

To restrict the answer 334A to the query 332A, the front-end server 326A may send a network request 412 to access control server 410A requesting identifier(s) of document namespace(s) the authenticated user is permitted to access. To facilitate this determination by access control server 410A, network request 412 may contain an indication or identifier of the authenticated user. For example, the indication or identifier can be a username, a session identifier token, a user account identifier, or other information that uniquely identifies the user and/or the user account the user successfully authenticated against.

In response to receiving network request 412, access control server 410A can lookup in a user account database (not shown in FIG. 4) identifier(s) of document namespace(s) the authenticated user is permitted to access using as a key in the lookup operation the indication or identifier of the authenticated user provided in the request 412.

Front-end server 326A may send network request 412 to access control server 410A at various different times, For example, front-end server 426A may send network request 412 in response to receiving query 332A. As another example, front-end server 426A may send network request 412 after successfully authenticating the user.

In response to receiving network request 412, access control server 410A returns a network response 413 including identifier(s) of authorized document namespace(s) the authenticated user is permitted to access. Each of the authorized document namespace identifiers uniquely identifies a document namespace the authenticated user is permitted to access at some access level according to explicit and/or implicit access controls on the document namespace. For example, an authorized document namespace identifier may identify a document namespace for which the authenticated user has at least read access to documents 340 belonging to the document namespace. For efficiency in processing subsequent network requests, front-end server 326A may store (cache) authorized document namespace identifier(s) as part of authentication session data 411 maintained for the authenticated user. In this case, it may not be necessary for front-end server 326A to send network request 412 to access control server 410A in response to receiving query 332A.

The network request including query 332A from the user's end-user computing device may also specify identifier(s) of document namespace(s) that the user wishes to search. In this case, an intersection of the set of identifier(s) of document namespace(s) that the user wishes to search and the set of identifier(s) of authorized document namespace(s) the user is permitted to access may be computed to determine identifier(s) of authorized document namespace(s) to search. This intersection may be performed by front-end server 326A. Alternatively, this intersection may be performed by access control server 410A. In this case, front-end server 326A may include identifier(s) of document namespace(s) that the user wishes to search in the network request 412 and the network response 413 thereto may include the result of the intersection as computed by access control server 410A.

If the network request including query 332A does not specify any requested document namespaces to search, then a default set of identifier(s) of authorized document namespace(s) to search may be selected. The selection of the default set can be performed by front-end server 326A from the identifier(s) of authorized document namespace(s) returned in response 413 or cached as part of authentication session data 411 as the case may be. Alternatively, access control server 410A may select the default set from the set of all document namespaces the user is permitted to access. In either case, the default set can identify a) all document namespaces the user is permitted to access (e.g., all document namespaces associated with the authenticated user's account), or b) a subset thereof.

After the identifier(s) of authorized document namespace(s) to search have been determined, a network request including the query 332A and the identifier(s) of authorized document namespace(s) to search may be sent from front-end server 326A to a routing server 420A for further processing of query 332A by query processor 327.

In response to receiving the network request from front-end server 326A including the query 332A and the identifier(s) of the authorized document namespace(s) to search, query processor 327 at routing server 420A determines one or more index servers 430 to which to route the query 332A. This determination may be made based on results of routing server 420A applying deterministic mapping function 416 to each of the identifier(s) of the authorized document namespace(s) to search. The deterministic mapping function 416 and index server mapping 417, given an identifier of a document namespace, may be used by routing server (e.g., 420A) to determine an index server (e.g., 430B) that stores an index shard (e.g., 328B) that indexes documents in the given document namespace.

According to some embodiments of the invention, deterministic mapping function 416 applies a one-way hash function, a simple hash function, a consistent hash function, or the like to a document namespace identifier to search in order to determine an index shard (e.g., 328B) to which the document namespace is assigned. To make this determination, the query processor 327 at routing server 420A may have access to index server mapping 417. Together, deterministic mapping function 416 and index server mapping 417 provide a way for query processor 327 at routing server 420A to determine a hostname or a network address of an index server (e.g., 430B) at which an index shard (e.g., 328B) containing an index for a given document namespace is stored.

In some embodiments of the invention, deterministic mapping function 416 may include a hash mechanism and a modulo mechanism. Hash mechanism may accept a document namespace identifier as input (e.g., character string data representing the document namespace identifier) and may produce a hash value hv as output. For example, the hash mechanism may comprise the MD4, MD5, SHA-1, or SHA2 message-digest algorithm which, when applied to a document namespace identifier provided as input, produces a hash value (e.g., a 32-bit hash value) as output. The modulo mechanism may compute the remainder r of division of the hash value hv by a modulus k, thereby mapping the input document namespace identifier to one of k values in the range of 0 to k−1. The value of the modulus k may be selected based on a variety of different factors including, for example, the number of actual, expected, or desired index servers 430, the number of actual, expected, or desired document namespaces indexed by document index 328, and/or the number of actual, expected, or desired document namespaces groups. In one exemplary embodiment, the value k is a power of 2 and equals at least 1024.

In some embodiments of the invention, index server mapping 417 includes an entry for each of the index servers 430. Each such entry is keyed by one or more non-overlapping sub-ranges in the range 0 to k−1. For example, a first entry E1 in mapping 417 may have a key including the values K1 and K2 defining a first range of consecutive values in the range 0 to k−1 and a second entry E2 in mapping 417 may have a key including the values K3 and K4 defining a second range of consecutive values in the range 0 to k−1 where the first range K1 to K2 does not overlap the second range K3 to K4.

When query processor 327 at the routing server 420A applies deterministic mapping function 416 to a given document namespace identifier, a value r in the range 0 to k−1 may be produced. The query processor 327 at the routing server 420A may then consult index server mapping 417 with the value r to identify the entry for which r is within the range of the entry key. A hostname or network address of this entry may identify an index server (e.g., 430B) at which an index shard (e.g., 328B) that indexes documents 340 belonging to the given document namespace is stored.

In some embodiments of the invention, the document namespaces assigned to an index shard (e.g., 328B) are grouped into a fewer number of document namespace groups of the index shard so as to reduce the number of index files stored at the index server (e.g., 430B) at which the index shard is stored. In other words, within an index shared (e.g., 328B), the document namespaces assigned to the index shard may be partitioned into document namespace groups. Each such document namespace group may comprise multiple document namespaces.

For example, each of two million (2,000,000) document namespaces assigned to an index shard (e.g., 328B) may be partitioned into one of eighty (80) document namespace groups of the index shard. For efficiency, an index server (e.g., 430B) at which an index shard (e.g., 328B) is stored may store one or more index files for each of the eighty (80) document namespace groups instead of storing one or more index files for each of the two million (2,000,000) document namespaces. In this case, the hash value hv output by the hash mechanism when applied to a given document namespace identifier may be used as an identifier of the document namespace group to which the given document namespace belongs.

In some embodiments, document namespace groups are not used to further partition an index shard (e.g., 328B). In these embodiments, the remainder r of the division of the hash value hv by the modulus k may be used as the identifier of the index shard to which a given document namespace is assigned. Also in these embodiments, the index server at which the index shard is stored may store one or more index files for all document namespaces assigned to the index shard. For example, the index server may store a single index file for all document namespaces assigned to the index shard.

Although, in FIG. 4, the index server mapping 417 is shown separately from the deterministic mapping function 416 and the query processor 327 at the routing server 420A, the index server mapping 417 may be a component of the deterministic mapping function 416 or a component of the query processor 327 at routing server 420A. Further, each of the routing servers 420 may have access to the index server mapping 417. In this case, a copy of the index server mapping 417 may be stored (cached) at each of the routing servers 420 for efficient access. In addition or alternatively, the index server mapping 417 may be made available to routing servers 420 as a network service. Serving system 325 may comprise multiple routing servers 420 scaled in a horizontal fashion for load balancing, increased capacity, increased throughput, reduced latency, failover, and/or redundancy purposes.

In an exemplary embodiment, the document index 328 indexes documents 340 in over four-hundred million (400,000,000) document namespaces and the deterministic mapping function 416 and the index server mapping 417 assign (map) each of the over 400 million document namespaces to one of approximately two hundred (200) index shards (e.g., 328A, 328B, 328C . . . 328N). In this exemplary embodiment, each index shard (e.g., 328A) indexes documents 340 in approximately two million (2,000,000) document namespaces.

In some instances, an index server (e.g., 430C) actually includes a plurality of servers distributed in a horizontal fashion to provide load balancing, failover, or redundancy for an index shard (e.g., 328C). In this case, each of the multiple index servers may store a replica or a copy of the index shard (e.g., 328C).

In some instances, an index server (e.g., 430A) includes multiple servers in which each of the multiple servers stores a portion of an index shard (e.g., 328A). In this case, there may be multiple levels of routing servers. A first routing level is exemplified by the routing server 420A that routes the query 332A received from the front-end server 326A to one or more of the index servers 430. A second level of routing servers may exist to further route queries within an index server (e.g., 430C) to one or more of the multiple servers of the index server. In this case, the second level routing servers may also have a deterministic mapping function and mapping like deterministic mapping function 416 and index server mapping 417 for further routing the queries based on identifiers of document namespaces.

In the example of FIG. 4, the query 332A is routed by the routing server 420A according to the deterministic mapping function 416 and the index server mapping 417 to index servers 430B and 430C. However, the query 332A could have just as easily been routed to just a single index server 430 or routed to more than two index servers 430, depending on the number of authorized document namespaces to search with the query 332A. For example, if there is only one authorized document namespace to search or if all of the authorized document namespaces to search are assigned to the same index shard (e.g., 328B), then the query 332A may have been routed by routing server 420A to just one index server (e.g., 430B).

When routing the query 332A to an index server (e.g., 430B), the routing server 420A may send a network request to the index server including the query 332A. In addition, the network request may comprise identifier(s) of authorized document namespace(s) to search assigned to an index shard (e.g., 328B) stored at that index server. In addition, each such authorized document namespace identifier may be associated in the network request with an identifier of the document namespace group to which the document namespace belongs.

In some embodiments of the invention, the query processor 327 at an index server (e.g., 430B) uses an identifier of a document namespace group in the network request received from the routing server 420A to limit the portion of an index shard (e.g., 328B) that is accessed when determining an answer (e.g., 418A) to the query 332A. For example, the query processor 327 at the index server may access only certain index database file(s) 351 stored in non-volatile memory at the index server or only certain data structures stored in volatile memory of the index server based on the document namespace group identifiers in the network request.

As an example, assume the network request including the query 332A sent from the front-end server 326A to the routing server 420A specifies that two authorized document namespaces are to be searched with corresponding document namespace identifiers "abcd" and "defg". Further assume that according to the deterministic mapping function 416 and the index server mapping 417, authorized document namespace "abcd" belongs to document namespace group "1234" and is assigned to index shard 328B and authorized document namespace "defg" belongs to document namespace group "5678" and is assigned to index shard 328C. In this case, the network request from the routing server 420A to the index server 430B may specify that document namespace "abcd" in document namespace group "1234" is to be searched and the network request from routing server 420A to index server 430C may specify that document namespace "defg" in document namespace group "5678" is to be searched. Index server 430B may use the document namespace group identifier "1234" in the network request sent to index server 430B to limit the portion of index shard 328B accessed by query processor 327 at index server 430B when formulating an answer 418A to the query 332A. Similarly, the index server 430C may use the document namespace group identifier "5678" in the network request sent to index server 430C to limit the portion of the index shard 328C accessed by the query processor 327 at index server 430C when formulating an answer 418B to the query 332A. Such limiting may include, for example, accessing only index database file(s) 351 stored in non-volatile memory of the index server and/or data in volatile memory of the index server associated with a specified document namespace group identifier.

The routing server 420A may route the query 332A to multiple index servers (e.g., 430B, 430C) so that the query processor 327 at each of the index servers 430 can process the query in parallel. For example, the routing server 420A may send a network request to index server 430B including query 332A at the same or roughly the same time as routing server 420A sends a network request to index server 430C including query 332A. In this case, the query processor 327 at index server 430B may process query 332A against index shard 328B at the same time or roughly the same time as the query processor 327 at index server 430C processes query 332A against index shard 328C.

When the query 332A is received at an index server (e.g., 430B), the query processor 327 at the index server may consult (access) the index shard (e.g., 328B) stored at the index server to determine documents 340 that satisfy the query. In doing so, the query processor 327 at the index server may restrict the documents 340 that can possibly be identified in an answer (e.g., 418A) to the query to only documents 340 that belong to an authorized document namespace to be searched. To do this restriction, the query processor 327 at the index server may use the authorized document namespace identifier(s) that accompanied the query 332A in the network request from the routing server 420A. In addition, document identifiers of documents 340 indexed in the index shard may be associated with the document namespace identifiers of the document namespaces to which the indexed documents 340 belong.

These associations facilitate query processor 327 restricting documents 340 that can be identified in an answer to the query to those documents 1) that satisfy the query 332A and 2) that are associated with a document namespace identifier that is one of the authorized document namespace identifiers to be searched. Even if an indexed document 340 would otherwise satisfy the query, the query processor 327 at the index server may not identify the document 340 in an answer 418A to the query 332 if the document 340 does not belong to one of the authorized document namespaces to search.

An answer (e.g., 418A) from an index server (e.g., 430B) returned to a routing server (e.g., 420A) may identify one or more documents 340 in one or more of the authorized document namespaces that satisfy the query 332A. The documents may be ranked according to a ranking function employed by query processor 327 at the index server. The ranking function can be based on query-dependent metrics and/or query-independent metrics computed for indexed documents.

An answer (e.g., 418A) from an index server (e.g., 430B) to the query 332A may include a ranking score for each identified document generated by the ranking function. The query processor 327 may employ the same ranking function at all of the index servers (e.g., 430A, 430B, 430C . . . 430N) so that ranking scores generated at different index servers for the same query are comparable. Using the same ranking function at all of the index servers also allows query processor 327 at the routing server 420A to combine documents 340 identified in the multiple answers 418A and 418B to the query 332A returned from index servers 430B and 430C into a single answer 334A that is returned to the front-end server 326A and ultimately to the end-user computing device 311A from which the query 332A was received by the front-end server 326A.

According to some embodiments of the invention, the front-end server 326A may apply a conventional spelling correction algorithm and/or a conventional phonetic correction algorithm (e.g., a soundex algorithm) to the obtained search query 332A. The spelling correction algorithm can apply different forms of spelling correction. For example, the spelling correction algorithm can apply a conventional isolated-term correction algorithm (e.g., edit distance and/or k-gram overlap) and/or a conventional context-sensitive correction algorithm. Accordingly, the query 332A forwarded to routing server 420A and routed to index servers 430 may reflect the results of spelling correction and/or phonetic correction performed on tokens of the query 332A by the front-end server 326A.

Index Shard

Figure 5:
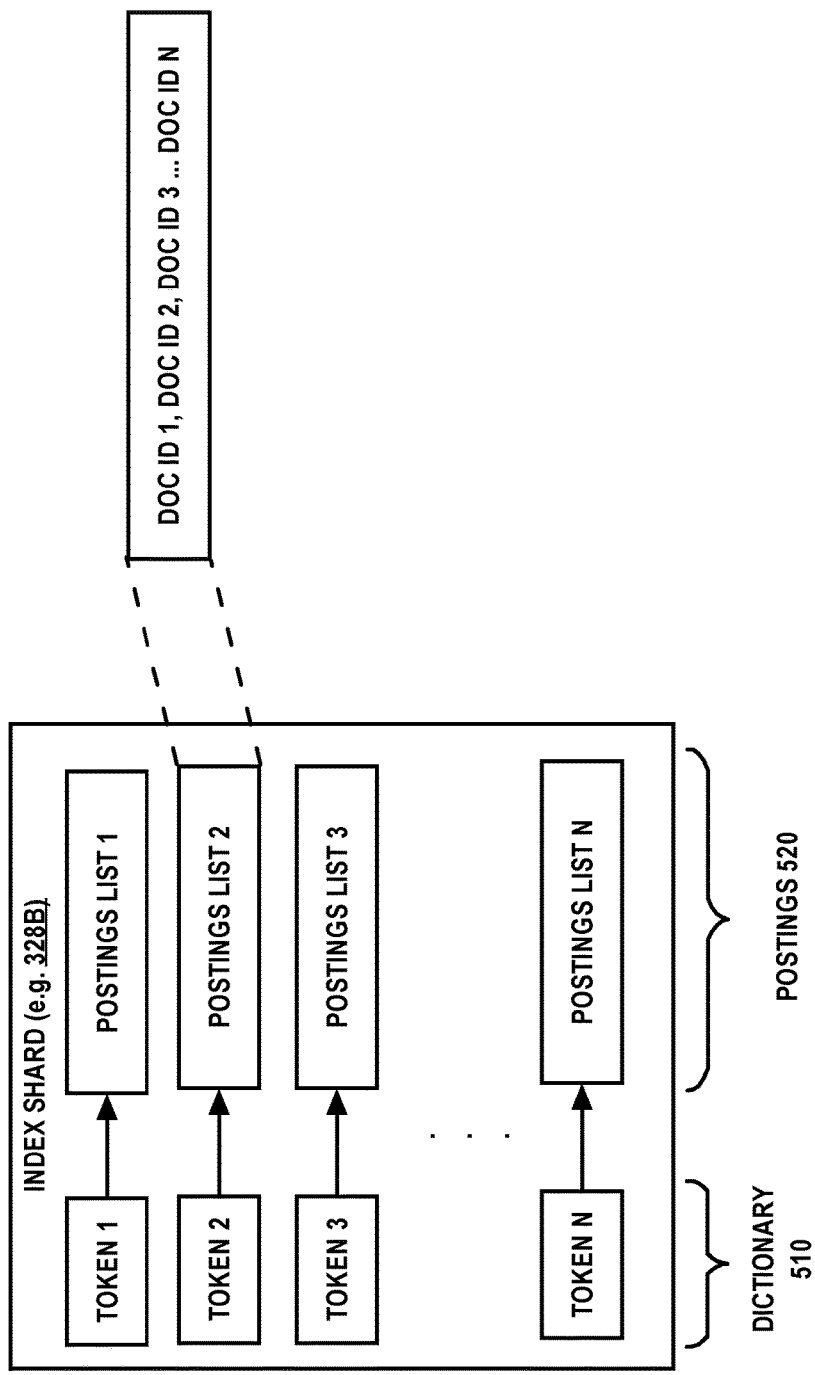
FIG. 5 is a block diagram of an index shard of a sharded document index in accordance with some embodiments of the invention.

Turning now to FIG. 5, it is a block diagram of an index shard (e.g., 328B) of document index 328 in accordance with some embodiments of the invention. According to some embodiments of the invention, an index shard may be structured as an inverted index including a dictionary 510 and a corresponding postings 520.

Dictionary 510 may comprise index tokens (e.g., TOKEN 1, TOKEN 2, TOKEN 3 . . . TOKEN N) by which documents 340 identified in postings 520 are indexed. Dictionary 510 also includes a pointer for each index token (e.g., TOKEN 1) to a postings list (e.g., POSTINGS LIST 2) of one or more document identifiers (e.g., DOC ID 1) that identifies which documents 340 the index token is indexed by (e.g., occurs in).

Dictionary 510 may also comprise information other than index tokens such as, for example, token attribute information such as, for example, token frequency information or other information that may be used by a ranking function of query processor 327 to rank or otherwise determine the relevancy of documents to a query in a query-dependent and/or query-independent manner.

A postings list (e.g., POSTINGS LIST 2) of postings 520 may comprise information other than document identifiers such as, for example, document-token attribute information such as, for example, token frequency of a token within a particular document 340, the position or positions of a token within a particular document 340, or other information that may be used by a ranking function of query processor 327 to rank or otherwise determine the relevancy of documents 340 to a query in a query-dependent and/or query-independent manner.

Document identifiers (e.g., DOC ID 1, DOC ID 2, DOC ID 3 . . . DOC ID N) in postings 520 may be associated with document namespace identifiers to indicate the document namespace to which the identified documents 340 belongs. This association also allows query processor 327 at an index server (e.g., 430B) to restrict an answer (e.g., 417A) to a query (e.g., 332) to identifying only documents 340 that belong to an authorized document namespace to be searched.

For example, an element in a postings list (e.g., POSTINGS LIST 2) may be prefixed with a document namespace identifier that identifies the document namespace to which the document 340 belongs. For example, an element in a postings list (e.g., POSTINGS LIST 2) may be character string data in the format <document namespace identifier>:<document identifier> where <document namespace identifier> is a character string data field identifying a document namespace and <document identifier> is a character string data field identifying a document 340 that belongs to the document namespace. The colon ':' character may be used as a separator character to separate character string data fields within a postings list element. Other separator characters are possible. It also possible to not use a separator character where, for example, character string data fields have fixed lengths. Other formats for the document identifier are possible and the invention is not limited to any particular prefix format.

Instead of prefixing document identifiers in postings lists with document namespace identifiers to associate documents 340 with the document namespaces they belong to, an index shard may comprise a many-to-one mapping that maps a given document identifier to the identifier of the document namespace to which the documents 340 belong. The mapping is many-to-one because a document namespace may contain multiple documents 340.

In some embodiments of the invention, for space efficiency and to reduce the size of postings 520, a document namespace identifier or a document identifier in a postings list (e.g., POSTINGS LIST 2) includes a local identifier that is local to the index shard (e.g., index shard 328B) and substitutes for a global document namespace identifier or a global document identifier that is larger in size (e.g., in terms of number of bytes). The local identifier may be smaller in size (e.g., in terms of number of bytes) than the global document namespace identifier or the global document identifier the local identifier substitutes for.

An index shard (e.g., 328B) may comprise a one-to-one mapping that maps a given local identifier to a global document identifier. Alternatively, there may be two one-to-one mappings, one of the mappings for translating local document namespace identifiers to global document namespace identifiers and the other mapping for translating local document identifiers to global document identifiers. As yet another alternative, there may be a one-to-one mapping for translating a given local document namespace identifier to the global document identifier and the global document namespace identifier of the document namespace to which the document 340 belongs.

In this description, unless otherwise clearly apparent in context, a "document identifier" of a document 340 refers to all possible forms of the document identifier that directly or indirectly (e.g., through an associative array) uniquely identifies the document 340 including a local document identifier of the document 340 and a global document identifier of the document 340.

Similarly, in this description, unless otherwise clearly apparent in context, a "document namespace identifier" of a document namespace refers to all possible forms of the document namespace identifier that directly or indirectly (e.g., through an associative array) uniquely identifies the document namespace including a local document namespace identifier of the document namespace and a global document namespace identifier of the document namespace.

According to some embodiments of the invention, when a query (e.g., 332) is received at an index server (e.g., 430B), query processor 327 at the index server uses the query tokens in the query as keys into a dictionary 510 to identify postings lists in a corresponding postings 520. If there are multiple query tokens in the query, the corresponding postings lists may be merged appropriately depending on how the query tokens are related together as a Boolean expression.

In some embodiments of the invention, query processor 327 at an index server restricts the documents 340 identified in the corresponding postings lists that can be included in an answer (e.g., 417A) to the query to only those documents 340 that belong to an authorized document namespace to be searched. Query processor 327 at the index server does this in some embodiments of the invention by comparing document namespace identifiers associated with document identifiers in the corresponding postings lists to authorized document namespace identifiers associated with the query (e.g., included in the network request that includes the query from a routing server (e.g., 420A)). If a document namespace identifier associated with a document identifier of a document 340 that otherwise satisfies the query matches an authorized document namespace identifier associated with the query, then the document 340 may be included in the answer to the query. However, if the document namespace identifier associated with the document identifier does not match an authorized document namespace identifier associated with the query, then the document 340 is not included in the answer to the query even if the document otherwise satisfies the query. In this way, query processor 327 at index servers 430 may restrict answers to queries to only documents 340 belonging to authorized document namespaces associated with the queries to be searched.

In some embodiments of the invention, an index shard stores multiple dictionary 510/postings 520 pairs. For example, an index shard may store a dictionary 510 and corresponding postings 520 for each of multiple document namespaces assigned to the index shard or for each of multiple document namespace groups assigned to the index shard.

In some embodiments of the invention, an index shard (e.g., 328B) may be organized into separately identifiable sets of index database files 351 and volatile memory data structures according to the identifiers of the document namespace groups assigned to the index shard. In this case, there may be a separate dictionary 510 or separate dictionaries 510 and corresponding postings 520 for each document namespace group assigned to the index shard. When a query (e.g., 332) is received at an index server (e.g., 430B), query processor 327 at the index server can use the document namespace group identifiers associated with the authorized document namespace identifiers in the network request from the routing server to determine which dictionary 510 or dictionaries 510 and corresponding postings 520 to access.

In some embodiments of the invention, an index shard (e.g., 328B) may be organized into separately identifiable sets of index database files and volatile memory data structures according to the identifiers of the document namespaces assigned to the index shard. In this case, there may be a separate dictionary 510 or separate dictionaries 510 and corresponding postings 520 for each document namespace assigned to the index shard. When a query (e.g., 332) is received at an index server (e.g., 430B), query processor 327 at the index server can use the document namespace identifiers in the network request from the routing server to determine which dictionary 510 or dictionaries 510 and postings 520 to access.

In some embodiments of the invention, an index shard stores separate dictionary 510/postings 520 pairs for processing different types of queries. For example, for a given document namespace or a given document namespace group associated to an index shard, the index shard may store a first dictionary 510/postings 520 pair for processing non-completion queries and a second dictionary 510/postings 520 pair for processing completion queries. Storing separate dictionary 510/postings 520 pairs allows the structure and content of a dictionary 510 and the corresponding postings 520 to be tailored for processing a certain type of query. For example, a dictionary 510 for processing completion queries may include only index tokens for filenames of documents as opposed index tokens for the full-text of the documents to reduce the size of the dictionary in terms of bytes consumed when stored on non-volatile memory (e.g., flash memory) or in volatile memory (e.g., RAM) and thereby allow query processor 327 to more quickly process completion queries.

Query processor 327 at an index server (e.g., 430C) may load a dictionary 510 (or a portion thereof) from non-volatile storage (e.g., flash memory) into volatile memory (e.g., RAM) for more efficient access. A postings list (e.g., POSTINGS LIST 2) may be stored in non-volatile memory (e.g., in flash memory) of an index server (e.g., 430C) and/or cached in volatile memory (e.g., RAM) of the index server for more efficient access. Cached postings lists may be evicted from volatile memory of the index server according to a cache eviction policy such as, for example, a least recently accessed policy. Query processor 327 at an index server (e.g., 430B) may also cache in volatile memory a postings list that is generated as a result of a merge algorithm performed on multiple posting lists retrieved from a postings 520. By doing so, query processor 327 at the index server may avoid having to perform the merge algorithm on the multiple postings lists at a later time.

Continuing to refer to FIG. 5, according to some embodiments of the invention, to facilitate processing of completion queries, index tokens in a dictionary 510 may be prefixed by document namespace identifiers and the prefixed index tokens may be sorted within the dictionary in a lexicographical order of the prefixed index tokens. A dictionary 510 configured in this way is referred to herein as a "completion" dictionary.

In some embodiments of the invention, the postings list associated with a prefixed index token may comprise document identifiers of documents 340 that belong to the document namespace identified in the prefixed index token. Thus, an index token may appear in a completion dictionary more than once, once for each of multiple document namespaces, if the completion dictionary includes prefixed index tokens for more than one document namespace.

For example, a prefixed index token in a completion dictionary may have the form <document namespace identifier>:<index token> where <document namespace identifier> is a character string data field identifying a document namespace and <index token> is a character string data field including the characters of the index token. The colon ':' character, or other character, may be used as a separator character to separate character string data fields within the prefixed index token. An example of a prefixed index token is [abcd:private] (without the enclosing brackets) where "abcd" is the identifier of a document namespace and "private" is the index token.

By sorting prefixed index tokens within a completion dictionary according to a lexicographical sorting of the prefixed index tokens, a query processor 327 at an index server (e.g., 430B) can more efficiently identify possible completions to a completion token of a completion query. In particular, as a result of the lexicographical sorting of prefixed index tokens, index tokens in a completion dictionary that belong to the same document namespace and that share a prefix that matches the completion token may be stored (clustered) near each other (e.g., in consecutive or contiguous memory locations) when the completion dictionary is stored in non-volatile memory or volatile memory. Such clustering facilitates sequential memory access when the query processor accesses the completion dictionary to determine possible completions to a completion token and also reduces or eliminates random memory access when the accessing the completion dictionary.

For example, index tokens "concession", "conclude", "conclusion", "concrete", and "concurrent" for document namespace "abcd" may be stored near each other in memory as prefixed index tokens "abcd:concession", "abcd:conclude", "abcd:conclusion", "abcd:concrete", and "abcd:concurrent", respectively. When processing a completion query with, for example, the completion token "con" and for which a particular document namespace having an identifier of, for example, "abcd" is an authorized document namespace to search, the query processor may generate an index key of "abcd:con" for accessing a completion dictionary. Since the prefixed index tokens are stored near each other in memory as a result of the lexicographical sorting, the query processor can more efficiently identify the index tokens "concession", "conclude", "conclusion", "concrete", and "concurrent" as possible completions for the completion token "con" in the document namespace "abcd" than if the prefixed index tokens were not stored near each other in memory.

In addition to prefixed index tokens of a completion dictionary being stored near each other in memory as a result of a lexicographical sorting of the prefixed index tokens, the pointers (e.g., addresses) of the completion dictionary associated with the sorted prefixed index tokens to the storage locations of the corresponding postings lists may also be stored near each other in memory as a result of a lexicographical sorting of the prefixed index tokens. In particular, a pointer to a storage location of a postings list for a prefixed index token may be stored near the prefixed index token in memory. For example, the pointer and the prefixed index token may be stored in the same memory block or same set of consecutive or contiguous memory blocks. Thus, not only can the query processor, for example, more efficiently identify the index tokens "concession", "conclude", "conclusion", "concrete", and "concurrent" as possible completions in the document namespace "abcd" for the completion token "con", the query processor can also more efficiently identify the storage locations of the posting lists corresponding to those index tokens as a result of the lexicographical sorting.

In some embodiments of the invention, sorting prefixed index tokens of a completion dictionary in a lexicographical order of the prefixed index tokens includes sorting a plurality of records (data structures) of the completion dictionary in which each such record includes a prefixed index token and an associated pointer (e.g., address) to a volatile or non-volatile memory location at which the postings list for the prefixed index token is stored. The plurality of records may be sorted according to a lexicographical ordering of their prefixed index tokens. Then the sorted records may be stored in consecutive or contiguous blocks of computer memory (e.g., volatile memory or non-volatile memory).

Token Store

As mentioned, build system 321 of multi-user search system 320 may comprise token store 324 and indexer 323.

Figure 6:
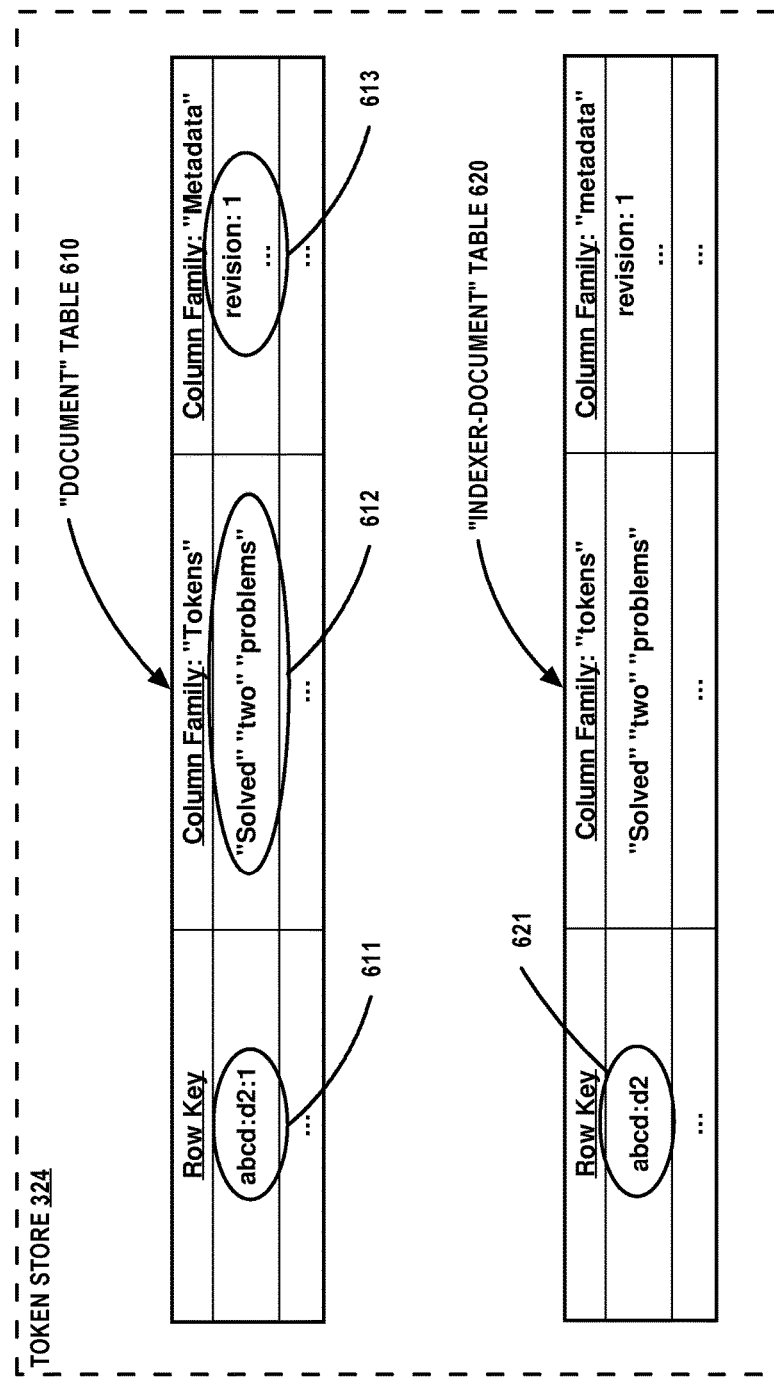
FIG. 6 illustrates a possible schema for a token store of a multi-user search system in accordance with some embodiments of the present invention.

FIG. 6 illustrates a possible schema for token store 324, according to some embodiments of the present invention. According to the schema, token store 324 includes two tables: "Document" table 610 and "Indexer-Document" table 620.

Document table 610 stores sets of tokens and metadata for versions of documents 340 processed by tokenizer 322 of build system 321. In a practical embodiment, Document table 610, at a given time, may store information only for a number r of the most recent versions of a document 340, where r may be selected based on various factors including, for example, a desired maximum size of Document table 610 or other factors according to the requirements of the particular implementation at hand. According to some embodiments, indexer 323 of build system 321 uses information in Document table 610 to generate index database files 351 as described in greater detail below.

Indexer-Document Table 620 stores sets of tokens and metadata for current versions of documents 340 processed by indexer 323. In some embodiments, the current version of a document is the latest (most recent) version of the document that has been processed by indexer 323. According to some embodiments, indexer 323 uses information in Document table 610 and Indexer-Document table 620 to generate index mutations 352 as described in greater detail below.

Document table 610 includes a number of rows. A row in Document table 610 may be keyed by a row key (e.g., 611). A row key (e.g., 611) in some embodiments is a byte array including a document namespace group identifier, a document identifier, and a document version identifier. The document identifier identifies a document. The document version identifier identifiers a particular version of the document. Thus, a row in Document table 610 may correspond to a document version. The document namespace group identifier identifies a group (collection) of one or more document namespaces that includes the document namespace to which the document belongs. The colon character (':') or other character or character sequence may be used in the byte array to separate the document namespace group identifier, the document identifier, and the document version identifier from each other.

Document table 610 includes a "Tokens" column family. For each row in Document table 610, the Tokens column family stores a list of tokens (e.g., 612) produced by tokenizer 322 from the corresponding document version. Although not shown in FIG. 6, the Tokens column family may also store various document version-token attributes of a token. Such document version-token attributes may include, for example, the frequency of the token and/or the position of the token in the corresponding document version.

According to some embodiments of the present invention, some document version-token attributes for a token for a corresponding document version that may be stored in the Document table 610 include the following, or a subset or a superset thereof:

data indicating whether the token is part of the filename of the document version, data indicating whether the token is part of the filename extension of the document version, data indicating whether the token is part of the file path of the document version, data indicating whether the token is part of the title of the document version, and/or data indicating whether the token is bolded or otherwise highlighted in the document version.

In some embodiments, for a row in Document table 610, the Tokens column family stores a list of tokens (e.g., 612) and a list of document version-token attributes. The list of tokens may be the same length as the list of document version-token attributes. An element at position i in the list of document version-token attributes includes document version-token attributes for the token at position i in the list of tokens. Alternatively, a single list may be stored instead of two lists. Each element in the single list is a tuple including a token and document version-token attributes of that token.

Document table 610 also includes a "Metadata" column family. For each row in Document table 610, the Metadata column family stores a set of named document version attributes (e.g., 613) of the corresponding document version. For example, in Document table 610, one of the document version attributes, named "revision", is the document version identifier of the corresponding document version. Other document version attributes are possible.

According to some embodiments of the present invention, some document version attributes for a corresponding document version that may be stored in the Document table 610 in addition to the document version's "revision" include the following document-version attributes, or a subset or a superset thereof:

the document version's size (e.g., in bytes), the document version's last modification date/time, whether the document version has been deleted from a cloud data storage service, whether all of the available text content of the document version has been completely tokenized, a timestamp indicating the date/time the document version was obtained by a cloud data storage service, the number of tokens extracted from the document version, a text summary of the document version, a text digest of the document version, and/or a text snippet from the document version.

The schema of Indexer-Document table 620 may be similar to Document table 610. In some embodiments, however, the row key (e.g., 621) of a row in Indexer-Document table 620 includes a document namespace group identifier and a document identifier but not a document version identifier. In these embodiments, each row in Indexer-Document table 620 may correspond to the latest (most recent) version of a document processed by indexer 323 as described in greater detail below.

In the example of FIG. 6, example row keys 611 and 621 are provided. For purposes of providing clear examples, the example row keys 611 and 621 comprise a document namespace group identifier of "abcd" and a document identifier of "d2". In some embodiments, however, a document namespace group identifier is an 64-bit fixed-length value that uniquely identifies a document namespace group and a document identifier is a 64-bit fixed length value that uniquely identifies a document. In some embodiments, a document version identifier uniquely identifies a version of a document and provides an ordering of the version with respect to other versions of the document. For example, document version identifiers for three version of a document may be the values "1", "2", and "3", respectively.

As mentioned, indexer 323 can both construct document index 328 by generating index database files 351 of document index 328 and generate index mutations 352 to document index 328 when documents 340 are created, modified, or deleted.

According to some embodiments, indexer 323 constructs a distributed document namespace-partitioned index including a plurality of partitions (shards). Each shard is stored on a corresponding index server of serving system 325. A document namespace is assigned to a corresponding index shard. The corresponding index shard indexes documents belonging to the document namespace. Multiple document namespaces may be assigned to the same index shard.

In some embodiments, a document namespace belongs to a document namespace group of document namespaces. In these embodiments, a document namespace group, including all of the document namespaces in the document namespace group, are assigned to a corresponding index shard. The corresponding index shard indexes documents belonging to the document namespaces in the document namespace group. Multiple document namespace groups may be assigned to the same index shard.

According to some embodiments, indexer 323 is designed to be able to construct document index 328 for a large collection of documents (e.g., billions of documents). In an exemplary embodiment, document index 328 indexes documents in over four-hundred million (400,000,000) document namespaces belonging to over sixteen thousand (16,000) document namespace groups assigned to one of approximately two hundred (200) index shards of document index 328.

Indexer 323 in some embodiments applies the MapReduce general architecture for distributed computing to construct a document namespace-partitioned index from information in token store 324. More information on MapReduce can be found in the paper by J. Dean and S. Ghemawat, "MapReduce: Simplified Data Processing on Large Clusters", Google, Inc., 2004, the contents of which is hereby incorporated by reference in its entirety.

MapReduce is designed for a computer cluster of commodity server computers (nodes) that are built from widely available hardware components (e.g., processor, memory, disk). The cluster typically includes a master node that directs the process of assigning tasks to individual worker nodes.

Bulk Indexer

Figure 7:
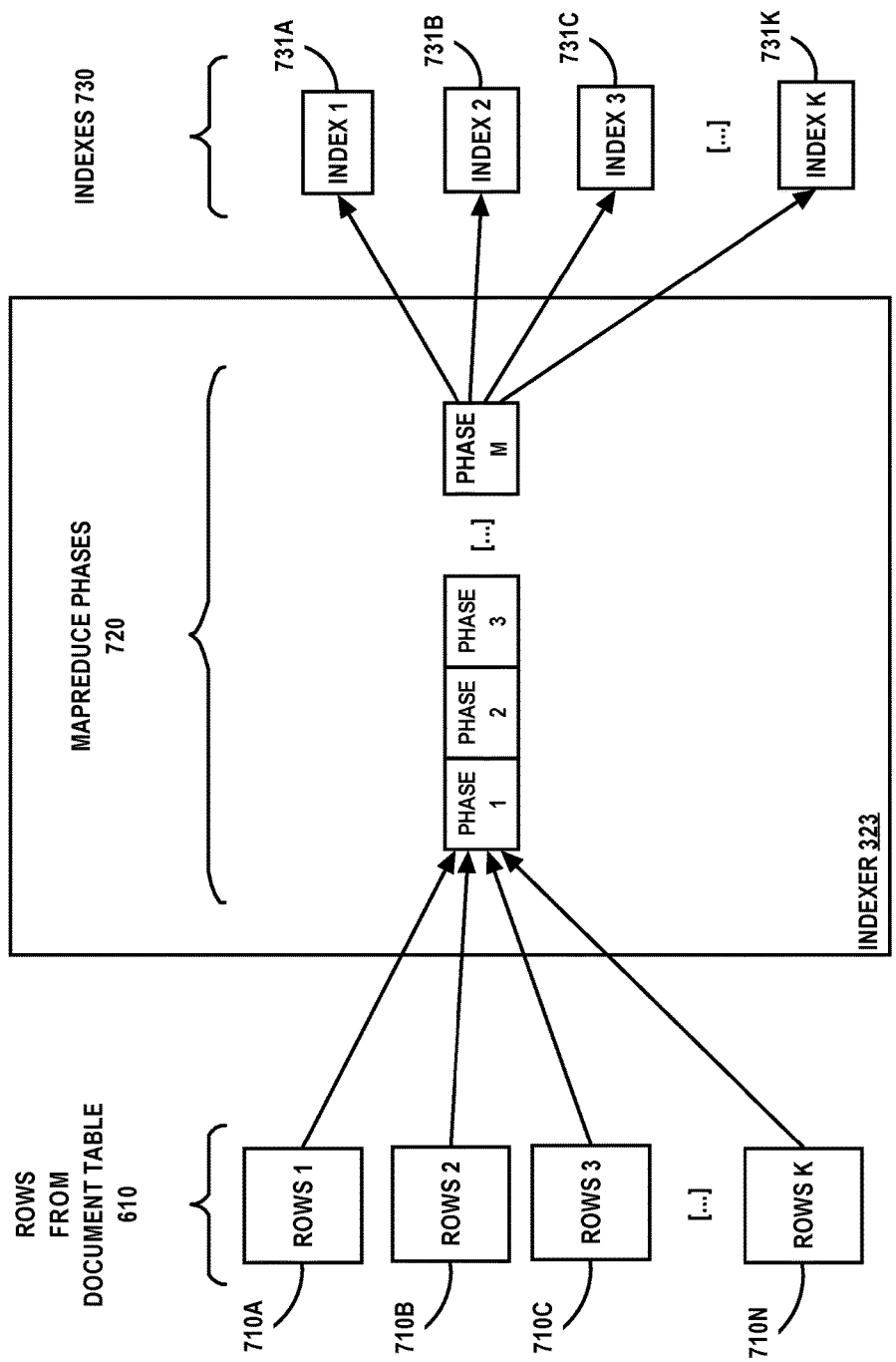
FIG. 7 is a block diagram of an indexer of a multi-user search system for constructing a sharded document index according to some embodiments of the present invention.

According to some embodiments, various MapReduce phases 720 are implemented by indexer 323 to construct document index 328 as shown in FIG. 7. The input data includes a collection of rows from Document table 610. The input collection is divided into a number K of row groups (e.g., 710A, 710B, 710C . . . 710N). The number K may be selected based on various factors. For example, K may be chosen to ensure that the master node can distribute MapReduce tasks evenly and efficiently among the worker nodes. In some embodiments, K is equal to a number of document namespace groups to construct indexes 730 for.

In some embodiments, a row group (e.g., 710B) includes the rows from Document table 610 for the most recent versions of all documents that belong to a specified document namespace group. The most recent version of a document may be identified in Document table 610 by the value of the "revision" column in the "Metadata" column family of the row for the most recent version of the document. For example, the most recent version may have the highest value for the "revision" column among all rows for the document in the document namespace group.

In some embodiments, the output of MapReduce phases 720 includes K number document namespace group indexes 730 where K is equal to a number of document namespace groups to construct indexes 730 for. In some embodiments, a document namespace group index (e.g., 731A) may comprise a "full-text" index database file 351. The full-text index database file 351 may store a sequence of entries sorted by corresponding keys. In some embodiments, each key includes an index term and the entry corresponding to the key includes a postings list. The postings list may comprise a list of document identifiers of documents in the document namespace group in which the index term occurs, along with possibly various other information such as, for example, document-term attributes for documents identified in the postings list.

In some embodiments, to reduce the size of a full-text index database file 351, a postings list of the full-text index database file 351 stores locally scoped document identifiers instead of actual document identifiers. A locally scoped document identifier uniquely identifies a document within a local scope. A local scope may correspond to a document namespace group or an index shard, for example. In contrast, an actual document identifier may uniquely identify a document within a larger scope. The larger scope may correspond to all document namespace groups or all index shards, for example. Because of the reduced scope, a locally scoped document identifier of a document may require fewer bytes to store than the actual document identifier of the document thereby reducing the size of the full-text index database file 351. A document namespace group index (e.g., 731A) may comprise a key-value mapping for translating from locally scoped document identifiers to actual document identifiers.

In some embodiments, a document identifier of a document in a postings list of a full-text index database file 351 is associated with a document namespace identifier of the document namespace to which the document belongs. In some embodiments, the document namespace identifier is a prefix of the document identifier in the postings lists such as in, for instance, <document namespace identifier>:<document identifier>, where <document namespace identifier> is a locally scoped or larger scope identifier of a document namespace, the colon character (':') is used to separate the document namespace identifier prefix from the document identifier, and <document identifier> is a locally scoped or larger scope identifier of a document. A document namespace group index (e.g., 731A) may comprise a key-value mapping for translating from locally scoped document namespace identifiers to actual document namespace identifiers.

In some embodiments, instead of prefixing a document identifier with a document namespace identifier, a document identifier of a document in a postings list of a full-text index database file 351 is associated with a document namespace identifier in a key-value mapping. For example, a document namespace group index (e.g., 731A) may comprise a key-value mapping for translating a given document identifier of a document to a document namespace identifier of the document namespace to which the given document belongs.

In some embodiments, a document namespace group index (e.g., 731A) may comprise a "completion" index database file 351. A completion index database file 351 may be like a full-text index database file 351. However, an index term in the completion index database file 351 may be prefixed by a document namespace identifier of a document namespace including a document in which the index term appears. By doing this, the index search space for keywords in a completion search query against entries in the completion index database file 351 can be limited to a document namespace. In some embodiments, the completion index database file 351 facilitates processing of completion queries as described in U.S. patent application Ser. No. 14/555,171, "Multi-User Search System with Methodology for Personalized Search Query Autocomplete."

In some embodiments, MapReduce phases 720 store indexes 730, including the index database files 351 thereof, in a distributed file system where they are available for retrieval (download) by index servers of serving system 325.

Embodiments of the present invention do not assume that documents 340 are static. Instead, embodiments of the present invention recognize that from time to time existing documents 340 may be modified, new documents 340 created, and/or existing documents 340 deleted. Such events may mean that postings in document index 328 for existing index terms need to be updated and/or new index terms with corresponding postings added to document index 328. In other words, when documents 340 are changed (i.e., a new document is added or an existing document modified or deleted), document index 328 may need to be updated.

In some embodiments, a document namespace group index (e.g., 731A) is updated by periodically reconstructing the entire document namespace group index according to the bulk indexing technique described above for all documents that belong to document namespaces in the document namespace group. For example, a document namespace group index (e.g., 731A) may be entirely reconstructed once a day or on some other regular interval. The periodic reconstruction solution may be acceptable if the number of changes to documents encompassed by the document namespace group between reconstructions is small and a time delay of up to the length of the reconstruction interval in making changes searchable is acceptable. However, it would be desirable in many cases to make changes to documents 340 searchable soon after the changes are made. For example, users would appreciate being able to search for new and modified documents 340 within minutes after the documents 340 are changed by the users as opposed to having to wait up to a day or more to search for the changes.

In some embodiments, quickly making changes to documents 340 searchable involves an index server of serving system 325 maintaining two indexes per document namespace group index (e.g., 731A). One of the two indexes is the main index of the document namespace group index and is referred to herein as the "base index" of the document namespace group index and the other of the two indexes stores only changes to the current base index and is referred to herein as the "delta index" of the document namespace group index. In some embodiments, the index server updates the delta index based on index mutations 352 received from indexer 323.

In some embodiments, the base index is treated as immutable in the sense that it is not directly updated by the index server with index mutations 352. Instead, only the delta index is updated with index mutations 352. The delta index may be stored in to memory (e.g. RAM) of the index server where the delta index may be more efficiently updated with index mutations 352 than if stored on disk or other non-volatile storage device. When a query is received at the index server, query processor 327 at the index server may run the query against both the delta index and the base index and merge the results.

In some embodiments, to avoid the delta index from becoming too large with updates from index mutations 352, the delta index and the base index are periodically discarded and replaced with a new, up-to-date base index generated according to the bulk indexing technique described above. A new delta index may then be generated relative to the new base index based on subsequent index mutations 352.

Delta and Base Indexes

Figure 8:
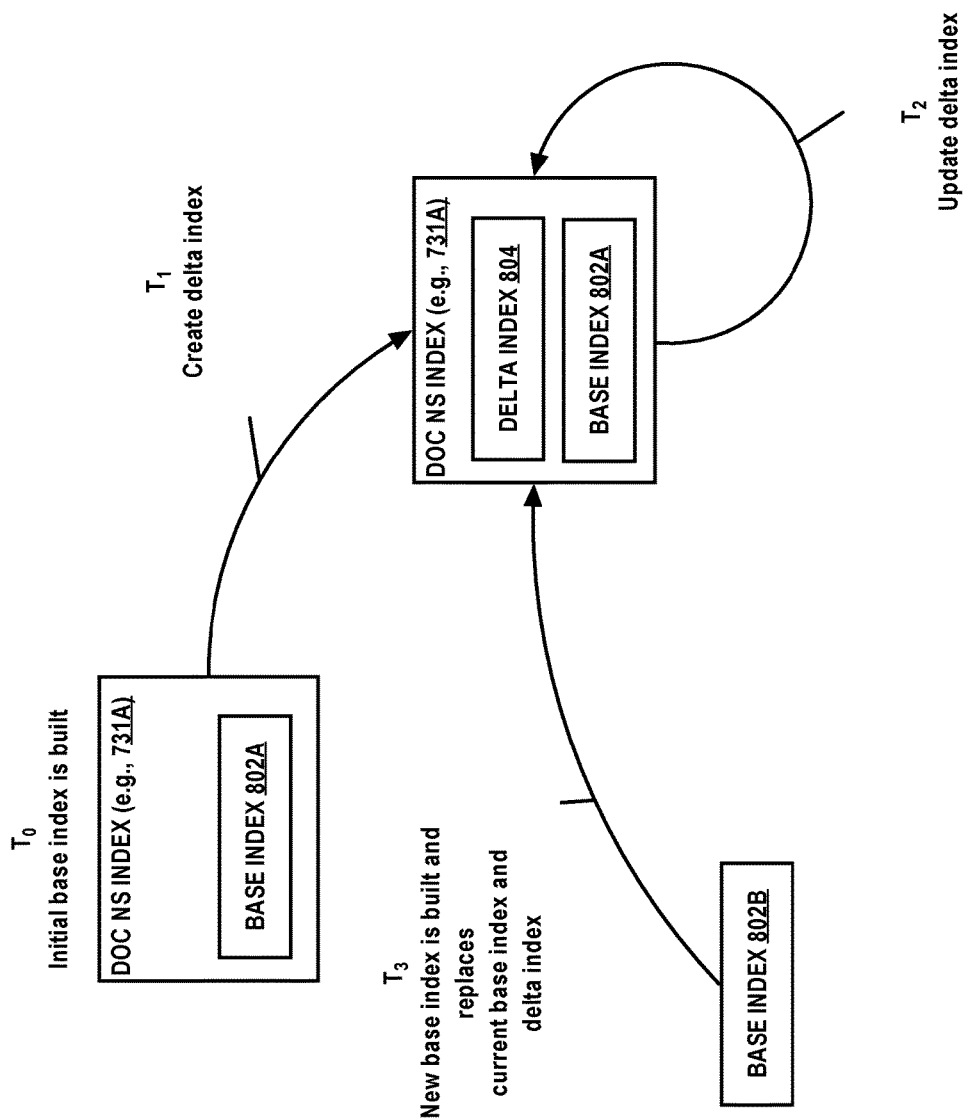
FIG. 8 illustrates a possible life cycle of an index at index server of a multi-user search system in accordance with some embodiments of the present invention.

A possible lifecycle in some embodiments of a document namespace group index (e.g., 731A) at an index server of serving system 325 is illustrated in FIG. 8.

At time T0, an initial version 802A of a base index is stored at the index server. Base index 802A may comprise one or more index database files 351 generated at a time prior to time T0 based on the tokens (e.g., 612) then in Documents table 610 in token store 324 for the highest versions of all of the documents in the document namespaces that belong to the document namespace group.

Sometime later, one or more changes to documents in the document namespace group are made. For example, a user may add a new document to one of the document namespaces in the group, edit an existing document in one of the document namespaces in the group, or remove a document from one of the document namespaces in the group. These changes result in indexer 323 sending one or more index mutations 352 to the index server. At time T1 after time T0, the index server applies the received index mutations 352 to create delta index 804 at the index server reflecting the document change(s).

Prior to time T1 (e.g., at time T0), base index 802A alone may be used to answer a query against a document namespace that belongs to the document namespace group. After time T1, both base index 802A and delta index 804 may be used to answer a query with results from each of the indexes merged to produce an answer to the query.

One or more additional changes may be made to documents in the document namespace group. The additional changes may be reflected in one or more additional index mutations 352 sent from indexer 323 to the index server. At time T2 after time T1, the index server applies the additional index mutations 352 to update delta index 804 at the index server reflecting the additional document change(s). After time T2, both base index 802A and updated delta index 804 may be used to answer a query with results from each of the indexes merged to produce an answer to the query.

At time T3 after time T2, a new version 802B of the base index is stored at the index server. The new base index 802B replaces the current delta index 804 and the current base index 802A at the index server. In other words, the index server discards base index 802A and delta index 804 and replaces it with new base index 802B. After time T3, the index server uses base index 802B to answer queries and no longer uses base index 802A and delta index 804 to answer queries. Base index 802B may comprise one or more index database files 351 generated at a time prior to time T3 and at or after time T0 based on the tokens (e.g., 612) then in Document table 610 in token store 324 for the highest versions of all of the documents in the document namespaces that belong to the document namespace group.

Rebuild of the base index for a document namespace group index can be triggered by a number of different events. For example, the base index may be rebuilt on a regular or periodic interval (e.g., every day at midnight). As another example, the base index may be rebuilt when it is detected that the current delta index of the document namespace group index has reached or exceeded a predetermined threshold size (e.g., one (1) gigabyte) or reached or exceeded a predetermined percentage size (e.g., twenty-five percent (25%)) of the current base index size. Other events may trigger rebuilding of the base index and the present invention is not limited to any particular event or set of events.

When a base index for a document namespace group index is built or rebuilt, it may reflect all changes to all documents in the document namespace group up to a certain point in time. For example, base index 802A may reflect all changes to all documents in the document namespace group of document namespace index 731A up to a time prior to time T0. Similarly, base index 802B may reflect all changes to all documents in the document namespace group of document namespace index 731A up to a time prior to time T3 and at or after time T0.

The cycle of replacing the current delta index and the current base index with a new base index may repeat continuously to keep the memory size of the delta index relatively small as compared to the base index thereby allowing the document namespace group index to be more efficiently (e.g., more quickly) updated at the index server with index mutations 352.

Instant Indexer

Figure 9:
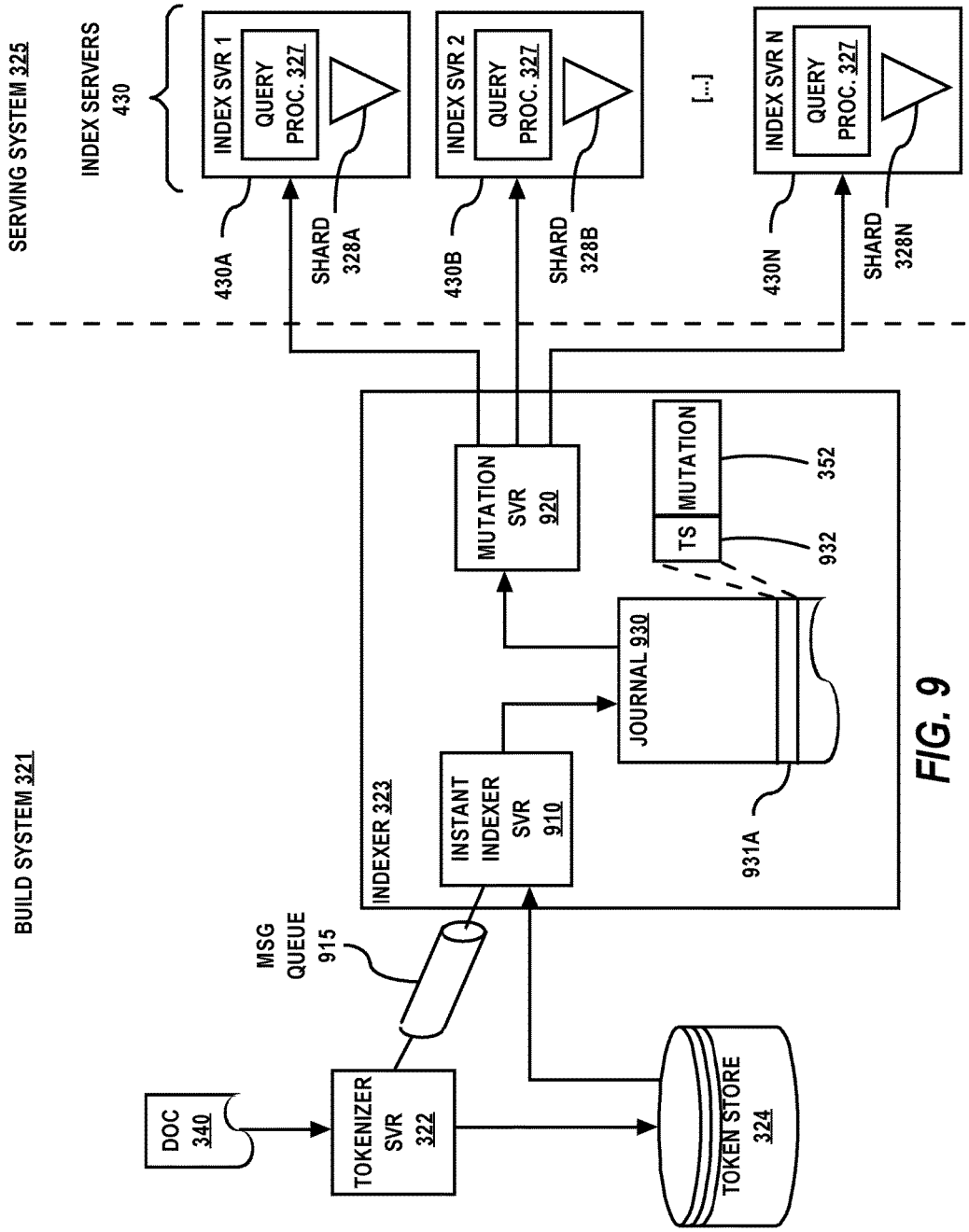
FIG. 9 is a block diagram of an indexer of a multi-user search system for generating index mutations to a sharded document index according to some embodiments of the present invention.

Turning now to FIG. 9, it is a block diagram of indexer 323 generating index mutations 352 to document index 328, according to some embodiments of the present invention.

In operation, new versions of documents 340 are obtained by tokenizer 322 of build system 321. Tokenizer 322 may obtain a new version of a document 340 in response to another system (not shown) detecting a change to the document. The detected change may be, for example, creation of the document (i.e., the new version of the document is the first version of the document) or a modification to the document (i.e., the new version of the document is the second or subsequent version of the document).

In the context of a cloud data storage service, a change to a document may be made by a user on a copy (replica) of documents stored at his or her end-user computing device (e.g., 311A). For example, a user may open a word processing document stored at the user's end-user computing device, make a change (e.g., an edit) to the word processing document, and thereafter save the change to the word processing document. Tokenizer 322 may receive notification of the change after the change (or a delta encoding thereof) has been synchronized (replicated) from the user's end-user computing device to the cloud data storage service, which also stores a copy (replica) of the document on one or more servers. For example, a software synchronization agent running at the user's end-user computing device may detect the change to the word processing document and send the change (or a delta encoding thereof) to the cloud data storage service server.

Upon obtaining a new version of a document 340, tokenizer 322 tokenizes the new version of the document 340 and generates a set of tokens for the new version of the document 340 as a result. Tokenizer 322 stores the set of tokens for the new version of the document 340 in Document table 610 of token store 324.

In addition to storing the set of tokens for the new version of the document 340 in Document table 610 of token store 324, tokenizer 322 generates and sends a "changed document" message to instant indexer server 910 (or just "instant indexer 910" for short) via message queue 915. In some embodiments, the changed document message includes the row key (e.g., 611) or other information for identifying the set of tokens in Document table 610 that tokenizer 322 stored in token store 324 for the new version of the document 340.

Instant indexer 910 continuously de-queues changed document messages from the head of message queue 915 and processes the changed document messages. To process a changed document message, instant indexer 910 initially determines if the new version of the document identified in the change document message for a new document (i.e., the first version of the document) or modified document (i.e., the second or subsequent version of the document).

If the changed document message is for a new document, instant indexer 910 reads the set of tokens from Document table 610 in token store 324 that were stored for the new version of the document by tokenizer 322. This set of tokens is the set of tokens by which to use to index the new document.

On the other hand, if the changed document message is for a modified document, instant indexer 910 reads the set of tokens from Document table 610 in token store 324 that were stored for the new version of the document by tokenizer 322 and reads the set of tokens from Indexer-Document table 620 in token store 324 that were previously stored by instant indexer 910 for a current version of the document. Instant indexer 910 identifies differences between the set of tokens for the new version of the document and the set of tokens for the version of the modified document. According to some embodiments, instant indexer 910 identifies "added" tokens in the set of tokens for the new version of the document that are not in the set of tokens for the current version of the document and identifies "removed" tokens in the set of tokens for the current version of the document that are not in the set of tokens for the new version of the document. Any such identified added tokens are tokens by which to use to index the modified document and any such identified removed tokens are tokens by which to no longer use to index the modified document.

Whether the changed document message is for a new document or a modified document, instant indexer 910 then adds an index mutation journal entry (e.g., 931A) to index mutation journal 930 for the changed document. The index mutation journal entry for the changed document includes a journal timestamp 932 determined by instant indexer 910 for the changed document and an index mutation 352 generated by instant indexer 910 for the changed document.

The journal timestamp 932 determined for the changed document generally reflects the date and time when the document was changed. More specifically, the journal timestamp 932 may reflect any time between when the document was changed and when the index mutation journal entry for the document was added to index mutation journal 930. For example, the journal timestamp 932 may reflect when the document was changed, when tokenizer 322 tokenized the new version of the document, when tokenizer 322 stored the set of tokens for the new version of the document in token store 324, when tokenizer 322 added a changed document message for the changed document to message queue 915, when instant indexer 910 de-queued the changed document message for the changed document from message queue 915, when instant indexer 910 generated the index mutation 352 for the changed document, when instant indexer 910 added the index mutation journal entry for the changed document to index mutation journal 930, or any other time between when the document was changed and when the index mutation journal entry for the changed document was added to index mutation journal 930.

In some cases, instant indexer 910 may determine the journal timestamp 932 for the changed document from a system clock of instant indexer 910. For example, instant indexer 910 may determine the current value of the system clock just before adding the index mutation journal entry for the changed document to index mutation journal 930. The determined current value of the system clock may be used as the journal timestamp 932 in the index mutation journal entry. In some cases, the system clock value may be normalized to a particular time zone (e.g., UTC±0) before storing as the journal timestamp 932 so that journal timestamps 932 determined based on values from system clocks are directly comparable without having to account for the particular time zones of the system clocks.

In some cases, instant indexer 910 may determine the journal timestamp 932 for the changed document from a timestamp in the changed document message for the changed document de-queued from the message queue 915. For example, the timestamp in the changed document message may reflect when the document was changed. The timestamp in the changed document message may be used as the journal timestamp 932 in the index mutation journal entry for the changed document. In some cases, the timestamp may be normalized to a particular time zone (e.g., UTC±0) before storing as the journal timestamp 932.

The index mutation 352 generated for the changed document may comprise various information including a document namespace group identifier, a document namespace identifier, a document identifier, a list of tokens to use to index the changed document, and/or a list of tokens to no longer use to index the changed document. The document identifier may identify the changed document. The document namespace identifier may identify the document namespace to which the changed document belongs. The document namespace group identifier may identify the document namespace group to which the document namespace belongs.

Index servers 430 of serving system 325 store document index 328. Document index 328 may be sharded across index servers 430 such that each index server (e.g., 430B) stores a shard (e.g., 328B) of document index 328. Each index server (e.g., 430A) may also comprise equivalent query processor 327 functionality.

Each shard (e.g., 328B) of document index 328 may comprise one or more document namespace group indexes (e.g., 731A). Each such document namespace group index may comprise a base index and a delta index as described above.

An index server (e.g., 430A) may periodically poll (e.g., send a network request to) index mutation server 920 for new index mutations 352 for that index server. In some embodiments, an index server (e.g., 430A) polls index mutation server 920 once every five (5) to ten (10) seconds for new index mutations 352. However, other polling intervals are possible including polling intervals shorter than five (5) seconds and longer than ten (10) seconds.

When polling index mutation server 920, an index server (e.g., 430B) provides a list of one or more document namespace group identifiers of document namespace groups and also provides a high watermark timestamp. The index server's high watermark timestamp represents a time up to which the shard (e.g., 328B) at the index server is up to date with respect to index mutations 352 in index mutation journal 930. In some embodiments, the high watermark timestamp is normalized to a particular time zone ((e.g., UTC±0) so that it is directly comparable to journal timestamps 932 in index mutation journal 930.

Responsive to receiving a poll request from an index server, index mutation server 920 reads index mutation journal 930 for any matching index mutation journal entries (e.g., 931A) that have a journal timestamp 932 that is newer (more recent) than the index server's high watermark timestamp and that comprise a document namespace group identifier that is one of the document namespace group identifiers specified in the poll request from the index server. The index mutations 352 in all such matching index mutation journal entries are sent to the index server in response.

An index server (e.g., 430B) may apply index mutations 352 received from index mutation server 920 to delta indexes at the index server. In particular, for a given index mutation 352 that specifies a document namespace group identifier and a document identifier and specifies a list of tokens to use to index the document and/or a list of tokens to no longer use to index the document, index server applies the index mutation 352 to the delta index for the document namespace group.

In some embodiments, for each token in the list of tokens to use to index the document, the token is added as an index key in the delta index, if not already an index key in the delta index, and the document identifier is added to the postings list in the delta index for the index key, if not already in the postings list. If the document identifier is already in the postings list but marked in the postings list as deleted from the postings list, then the document identifier is unmarked (i.e., not marked as deleted as from the postings list).

In some embodiments, for each token in the list of tokens to no longer use to index the document, the token is added as an index key in the delta index, if not already an index key in delta index, and the document identifier is added to the postings list in the delta index for the index key and the document identifier, if not already in the posting list, is marked in the postings list as deleted from the postings list. If the document identifier is already in the postings list but not marked as deleted in the postings list, then the document identified is marked in the postings list as deleted from the postings list.

Document identifiers in postings lists may be marked as deleted or not deleted using one of several different possible tracking schemes including, for example, a deletion bit vector per postings list including a bit for each document identified in the postings list. One of the two bit values is used to indicate that the corresponding document is indexed by the corresponding index term and the other of the two bit values is used to indicate that the corresponding document is no longer indexed by the corresponding index term.

When processing a query against a document namespace group index including a delta index and a base index, query processor 327 retrieves postings lists for query keywords from both the delta index and the base index and merges the retrieved postings lists. Query processor 327 may then filter out documents marked as deleted in the merged posting lists from the query answer.

After an index server (e.g., 430A) applies index mutations 352 received from index mutation server 920 in response to a poll request, the index server updates the index server's high watermark timestamp to reflect that the shard (e.g., 328A) at the index server is up-to-date with respect to the applied index mutations 352. For example, the new high watermark timestamp value may be set to the latest (most recent) journal timestamp 932 of all index mutations 352 that were applied in response to the poll request. To facilitate this, index mutation server 920 may provide the journal timestamps 932 along with the corresponding index mutations 352 when replying to a poll request from an index server.

In some embodiments, index mutation journal 930 is implemented as an append-only distributed commit log. By doing so, disk seeking may be reduced when instant indexer 910 writes index mutation journal entries (e.g., 931A) to the journal 930.

The following description presents method steps that may be implemented using computer-executable instructions, for directing operation of a device under processor control. The computer-executable instructions may be stored on a computer-readable medium, such as CD, DVD, flash memory, or the like. The computer-executable instructions may also be stored as a set of downloadable computer-executable instructions, for example, for downloading and installation from an Internet location (e.g., Web server).

While a certain order for the method steps may be implied by the figures and the following description, it will be understood that, unless the context clearly indicates otherwise, the method steps may be performed in a different order than is shown and/or described. Further, unless the context clearly indicates otherwise, the method steps may be performed in parallel (concurrently) with one another.

Instant Indexer Example Operation

Figure 10A:
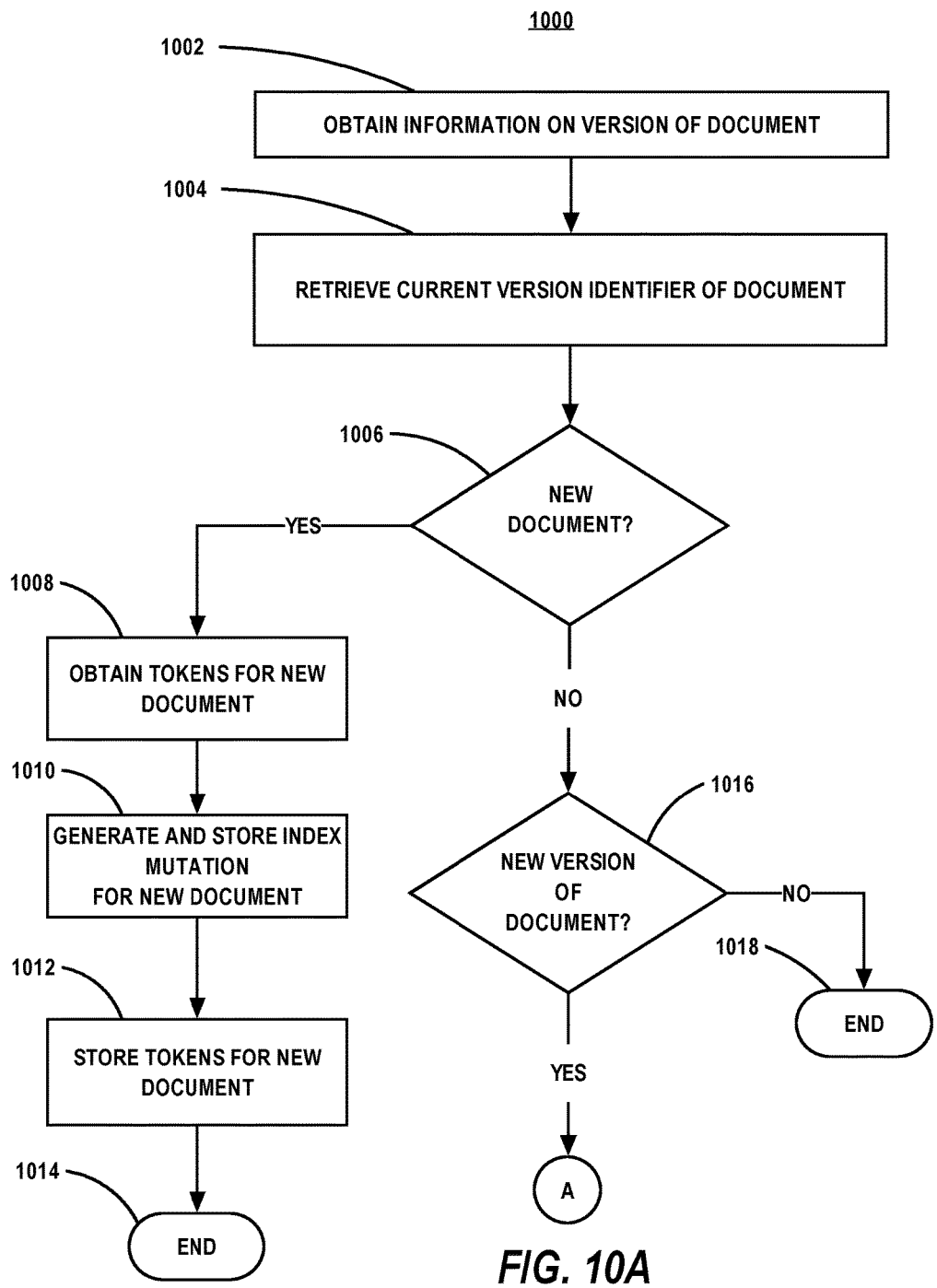
FIG. 10A and FIG. 10B includes a flowchart of example operation of an instant indexer of a multi-user search system according to some embodiments of the present invention.
Figure 10B:
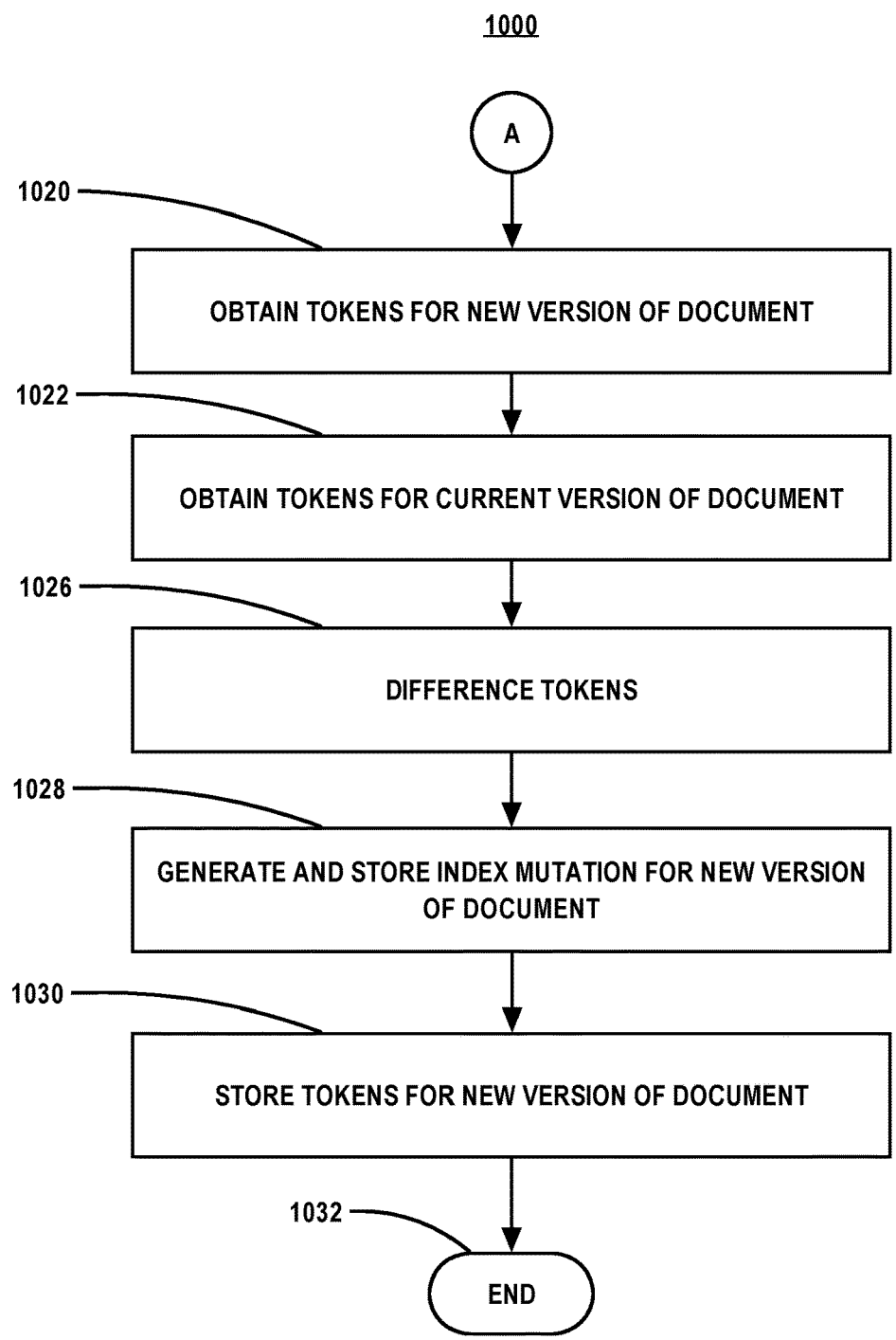
Figure 11A:
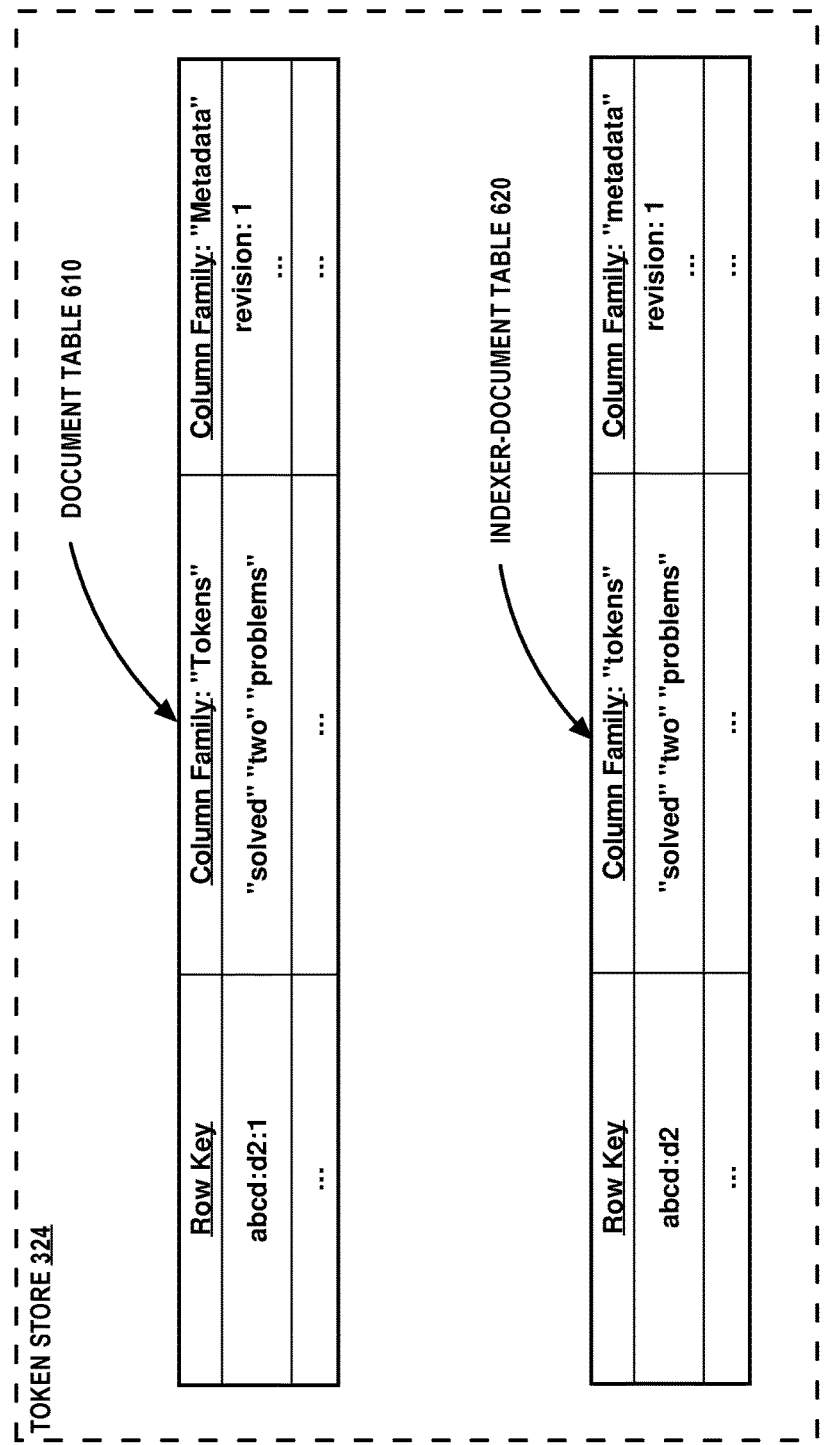
FIG. 11A and FIG. 11B illustrate various possible states of a token store of a multi-user search system during the example operation of the instant indexer according to some embodiments of the present invention.
Figure 11B:
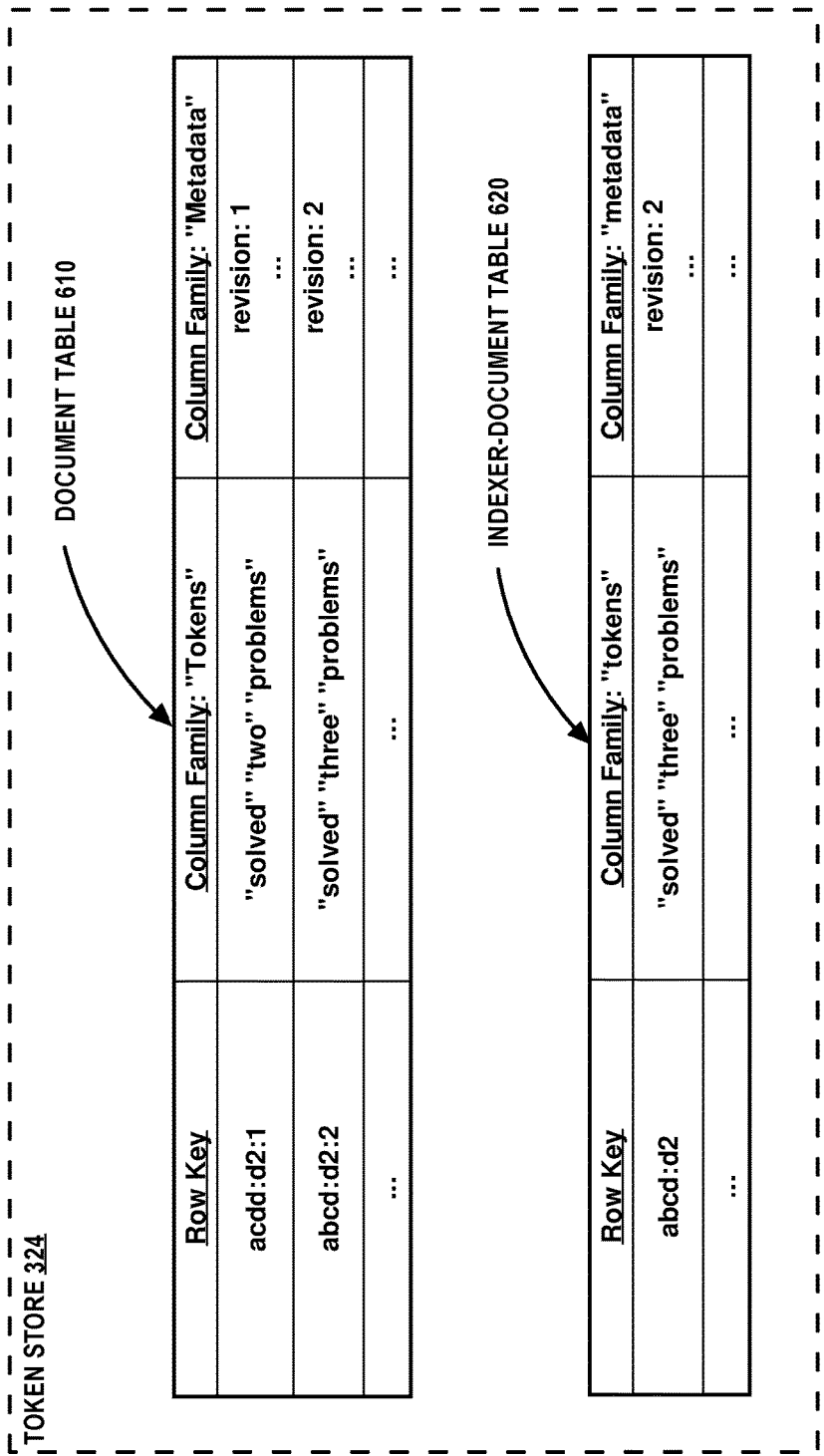

To illustrate example operation of instant indexer 610 reference will now be made to FIG. 9, FIG. 10A, FIG. 10B, FIG. 11A, and FIG. 11B. FIG. 10A and FIG. 10B includes a flowchart 1000 of example operation of instant indexer 910, according to some embodiments of the present invention. FIG. 11A and FIG. 11B illustrates various possible states of token store 324 during the example operation of instant indexer 910, according to some embodiments of the present invention.

At step 1002, instant indexer 910 obtains information on a version of a changed document. For example, instant indexer 910 may obtain the information in a changed document message de-queued from message queue 915. The information may comprise a document identifier of the changed document, a document namespace group identifier of a document namespace group to which the document namespace that contains the changed document belongs, and a document version identifier of the version of the changed document. For example, assume at step 1002 for purposes of illustrating an example, instant indexer 610 obtains a document namespace group identifier of "abcd", a document identifier of "d2", and a document version identifier of "2". In some embodiments, the information includes a document namespace identifier in addition to or instead of the document namespace group identifier.

At step 1004, instant indexer 910 retrieves the current version of the changed document from Indexer-Document table 420, if one is available. For example, FIG. 11A shows that the current version of changed document "d2" in the Indexer-Document table 620 is "1" as indicated by the value of the "revision" column in the "metadata" column family in the row keyed by row key "abcd:d2".

At step 1006, instant indexer 910 determines whether the version of the changed document is a new document. In some embodiments, instant indexer 910 makes this determination by determining if a current version of the changed document was available in step 1004. If no current version for the changed document was available in Indexer-Document 420 at step 1004, then the version of the changed document is assumed to be a new document. Otherwise, the version of the changed document is assumed to be a modified document. For example, since the current version of changed document "d2" is available as shown in Indexer-Document table 620 of FIG. 11A, instant indexer 910 would determine at step 1006 that version "2" of changed document "d2" is not a new document.

However, if the version of the changed document is a new document, then, at step 1008, instant indexer 910 obtains the set of tokens for the new document from Document table 610 of token store 324. To retrieve the set of tokens for the new document, instant indexer 610 can retrieve the set of tokens from the row of Document table 910 keyed by the row key including the document namespace group identifier, the document identifier, and the document version identifier obtained at step 1002.

Also, if the version of the changed document is a new document, then, at step 1010, instant indexer 910 generates an index mutation 352 including the set of tokens retrieved at step 1008 for the new document. The set of tokens may be designated in the generated index mutation 352 as tokens to use to index the document. The generated index mutation 352 may also comprise information identifying the document, the document namespace, and/or the document namespace group to which it pertains such as, for example, a document identifier, a document namespace identifier, and/or a document namespace group identifier obtained at step 1002. In addition, instant indexer 910 determines a journal timestamp 932 and adds a journal entry (e.g., 931A) for the new document to journal 930 including the index mutation 352 and the journal timestamp 932.

Also, if the version of the changed document is a new document, then, at step 1012, the set of tokens retrieved at step 1008 for the new document are stored in Indexer-Document table 620. If the version of the changed document is a new document, a new row for the new document may be added to Indexer-Document table 620 having a row key including the document group identifier and the document identifier obtained at step 1002. In addition to including the set of tokens retrieved at step 1008 for the new document, the value of the "revision" column in the Metadata column family of the new row is set to the current version of the new document. The current version may be, for example, "1". The current version of a document represents the latest (most recent) version of the document that instant indexer 910 has processed (e.g., generated an index mutation 352 for).

After the new row is added to Indexer-Document table 620 for the new document, processing of the version of the changed document by instant indexer may then end 1014.

Returning to step 1006, if, however, at step 1006, the version of the changed document is not determined to be a new document, then the version of the changed document is considered to be a version of a modified document. For example, since the current version "1" of changed document "d2" is available as shown in Indexer-Document table 620 of FIG. 11A, instant indexer 910 would determine at step 1006 that version "2" of changed document "d2" is a version of a modified document.

At step 1016, instant indexer 910 then determines if the version of the modified document is a new version of the modified document. The version of the modified document may not be a new version of the modified document if instant indexer 910 is notified of versions of the modified document out of order. For example, instant indexer 910 may de-queue and process a changed document message from message queue 915 for a later version of a document before de-queueing and processing a changed document message from message queue 915 for an earlier version of the document.

To determine if the version of the modified document is a new version of the modified document, instant indexer 910 may compare the document version identifier for the version of the modified document obtained at step 1002 to the current version of the modified document obtained from Indexer-Document table 620 at step 1004. If the document version identifier obtained at step 1002 is greater than the current version, then the version of the modified document is a new version of the modified document. Otherwise, the version of the modified document is not a new version of the document and processing of the version of the changed document may end 1018. For example, instant indexer 910 may determine that, because version "2" of document "d2" is greater than current version "1" of document "d2", version "2" of document "d2" is a new version of document "d2".

If the version of the modified document is a new version of the modified document, then, at step 1020, instant indexer 910 obtains a set of tokens for the new version of the modified document. The set of tokens may be obtained from Document table 610 of token store 324 which were stored there by tokenizer 322 when tokenizing the new version of the modified document. To retrieve the set of tokens for the new version of the modified document, instant indexer 610 can retrieve the set of tokens from the row of Document table 610 keyed by the row key including the document namespace group identifier, the document identifier, and the document version identifier obtained at step 1002. For example, the set of tokens for version "2" of document "d2" includes the tokens "solved" "three" "problems" as shown in the row keyed by row key "abcd:d2:2" of Document table 610 of FIG. 11B.

At step 1024, instant indexer 910 obtains a set of tokens for the current version of the modified document. This set of tokens may be obtained from Indexer-Document table 620 of token store 324 based on the current version of the modified document obtained at step 1004 and the document namespace group identifier and the document identifier obtained at step 1002. For example, the set of tokens for current version "1" of document "d2" includes the tokens "solved" "two" "problems" as shown in the row keyed by row key "abcd:d2" of Indexer-Document table 610 of FIG. 11A.

At step 1026, instant indexer 910 identifies differences between the set of tokens for the current version of the modified document and the set of tokens for the new version of the modified document. In particular, instant indexer 910 identifies tokens to use to index the modified document and tokens to no longer use to index the modified document. The tokens to use to index the modified document may be identified from tokens in the set of tokens for the new version of the modified document that are not in the set of tokens for the current version of the modified document. The tokens to no longer use to index the modified document may be identified from tokens in the set of tokens for the current version of the modified document that are not in the set of tokens for the new version of the modified document. For example, the token "three" would be identified as a token to index document "d2" by because the token "three" is in the set of tokens for new version "2" of the document "d2" as shown in Document table 610 of FIG. 11B but not in the set of tokens for current version "1" of document "d2" as shown in Indexer-Document table 620 of FIG. 11A. Also, the token "two" would be identified as a token to no longer use to index document "d2" because the token "two" is in the set of tokens for current version "1" of document "d2" as shown in Indexer-Document table 620 of FIG. 11A but not in the set of tokens for new version "2" of the document "d2" as shown in Document table 610 of FIG. 11B.

At step 1028, instant indexer 910 generates an index mutation 352 for the new version of the modified document including any tokens determined at step 1026 to use to index the modified document and any tokens determined at step 1026 to no longer use to index the modified document. The tokens may be designated as such in the index mutation 352. The generated index mutation 352 may also comprise information identifying the document, the document namespace, and/or the document namespace group to which it pertains such as, for example, a document identifier, a document namespace identifier, and/or a document namespace group identifier obtained at step 1002. In addition, instant indexer 910 determines a journal timestamp 932 and adds a journal entry (e.g., 931A) for the new document to journal 930 including the index mutation 352 and the journal timestamp 932. For example, an index mutation 352 generated and stored for new version "2" of document "d2" may comprise the token "three" and designated (e.g., with a label) as a token to use to index document "d2", the token "two" and designated as a token to no longer use to index document "d2", the document namespace group identifier "abcd", and the document identifier "d2".

At step 1030, after instant indexer 910 generates an index mutation 352 for the new version of the modified document, the set of tokens retrieved at step 1020 for the new version of the modified document are stored in Indexer-Document table 620. In doing so, the row in Indexer-Document table 620 for the current version of the modified document may be modified to include the set of tokens and to include a new value for the "revision" column in the Metadata column family set to the new version of the modified document. By modifying the row in this way, the new version becomes the new current version of the modified document. For example, the new current version of document "d2" is "2" after generating an index mutation 352 for version "2" of document "d2", as shown in Indexer-Document table 620 of FIG. 11B.

After the row for the modified document is modified in Indexer-Document table 620 to include the set of tokens and set the new current version, processing of the version of the changed document by instant indexer may then end 1032.

Process for Instant Indexing

Figure 12A:
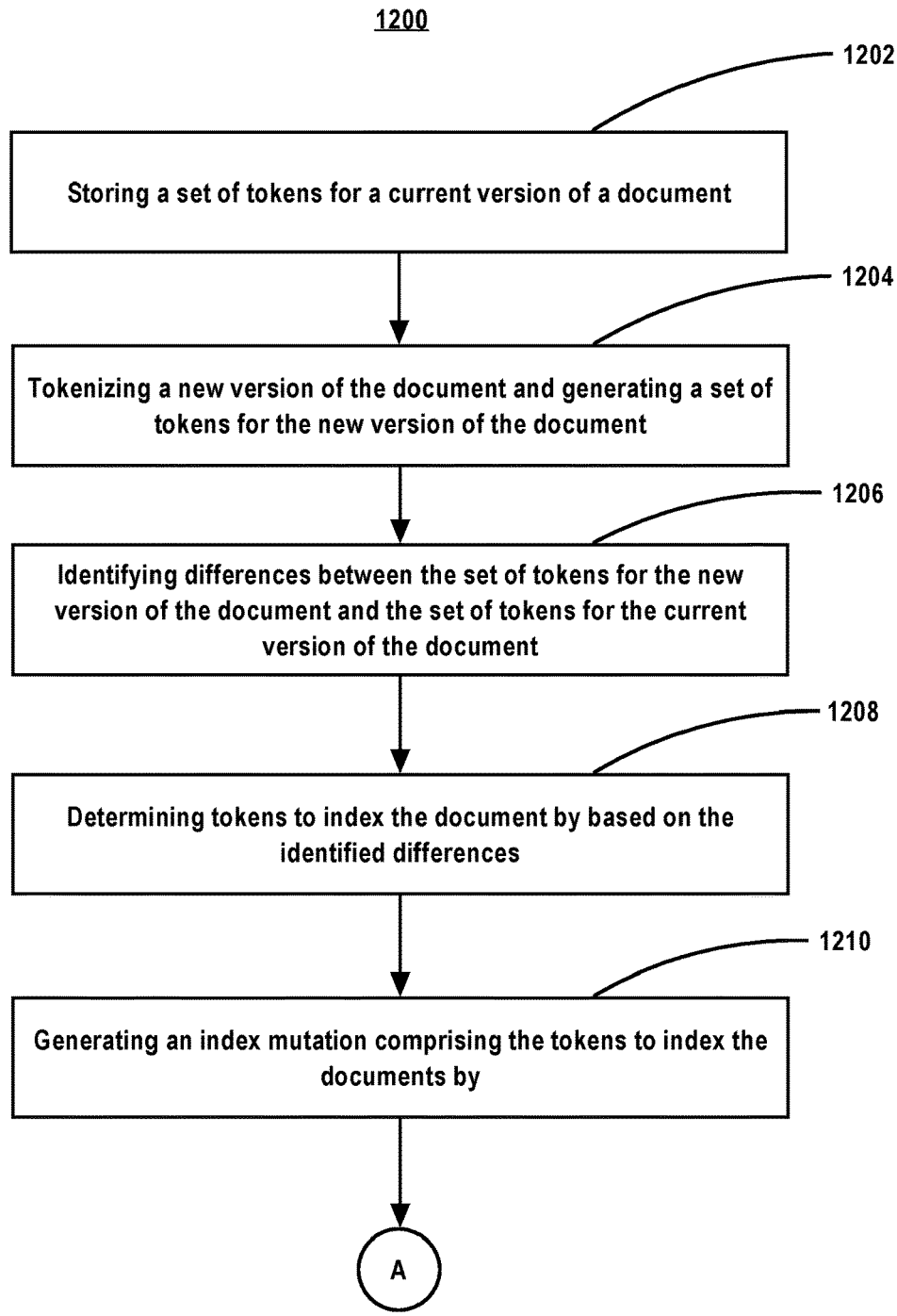
FIGS. 12A and 12B comprise a flowchart of a process for instant indexing according to some embodiments of the present invention.
Figure 12B:
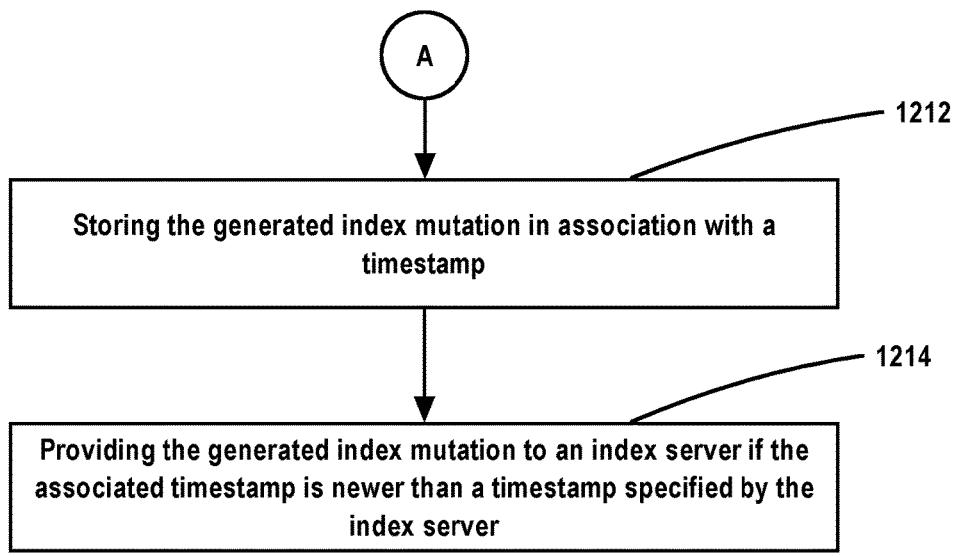

Turning now to FIG. 12A and FIG. 12B, they comprise a flowchart 1200 of a process performing by one or more servers of a multi-user search system for instant indexing, according to some embodiments of the present invention.

At step 1202, the servers perform storing a set of tokens for a current version of a document as described herein. For example, instant indexer 910 may add or modify a row for the current version of the document in Indexer-Document table 620 of token store 324 to include the set of tokens for the current version of the document. For example, the row in Indexer-Document table 620 of FIG. 11A may be added for current version "1" of document "d2". For example, the row in Indexer-Document table 620 of FIG. 11B may be modified for current version "2" of document "d2".

At step 1204, the servers perform tokenizing a new version of the document and generating a set of tokens for the new version of the document as described herein. For example, tokenizer 322 may tokenize new version "2" of document "d2" including the character sequence "solved two problems" to generate the set of tokens "solved", "two", and "problems".

At step 1206, the servers perform identifying differences between the set of tokens for the new version of the document and the set of tokens for the current version of the document as described herein. For example, instant indexer 910 may identify differences between the set of tokens "solved", "three", and "problems" for new version "2" of document "d2" and the set of tokens "solved", "two", and "problems" for current version "1" of document "d2".

At step 1208, the servers perform determining tokens to use to index the document based on the identified differences as described herein. To do this determination, the servers identify tokens in the set of tokens for the new version of the document that are not in the set of tokens for the current version of the document as described herein. For example, instant indexer 910 may identifying the token "three" to index document "d2" by based on identifying token "three" in the set of tokens "solved", "three", and "problems" for new version "2" of document "d2" that is not in the set of tokens "solved", "two", and "problems" for current version "1" of document "d2".

At step 1210, the servers perform generating an index mutation including the tokens to use to index the document as described herein. For example, instant indexer 910 may generate an index mutation 352 including the token "three" to index document "d2" by.

At step 1212, the servers perform storing the generated index mutation in association with a timestamp as described herein. For example, instant indexer 910 may store the generated index mutation 352 including the token "three" to index document "d2" by in index mutation journal 930 in association with a journal timestamp 932.

At step 1214, the servers perform providing the generated index mutation to an index server if the timestamp associated with the generated index mutation is newer than a timestamp specified by the index server as described herein. For example, the generated index mutation may be provided to the index server in response to a poll request for index mutations from the index server. The poll request may comprise a high watermark timestamp as described above for the index server. The generated index mutation may be provided to the index server if the timestamp associated with the generated index mutation is newer than the high watermark timestamp. For step 1214, the associated timestamp being newer than the specified timestamp is a necessary but not sufficient condition for providing the generated index mutation to the index server. For example, even if the timestamp associated with the generated index mutation is newer than the specified timestamp, the index mutation may not be provided to the index server if the index mutation is for a different index server.

Bypassing Instant Indexing

In some circumstances, it may be inefficient to index all changes to documents in the same way. For example, in some circumstances, it may be more efficient to bypass the instant indexing functionality provided by indexer 323 to index servers 430 when a large set of documents 340 is provided to build system 321 for processing in a short amount of time (e.g., ten thousand (10,000) or more documents 340 per second or a billion or more documents 340 per day. In this case, the delta indexes stored in volatile memory at index servers 430 may become too large (e.g., several gigabytes or more) as a result of the large number of index mutations 352 provided by index mutation server 920 from index mutation journal 930 to index servers 430 when polling for new index mutations. In a worst case, the number of index mutations 352 provided to an index server (e.g., 430B) may be so high that the index server crashes or fails.

According to some embodiments, the instant indexing mechanism is bypassed when indexing documents in bulk. For example, if a user moves a folder at their end-user computing device containing a large set of documents that is synchronized with a cloud data storage service from one file system location to another, the move can result in a large number of document changes being generated for build system 321 to process. For example, the user's move of the folder may cause a "delete" document change and an "add" document change for each document within the folder. In this case, bypassing the instant indexing mechanism of build system 321 for the document changes resulting from the folder move may avoid index server failure. Bypassing may also be useful for re-indexing existing documents in bulk such as, for instance, re-indexing a large set of documents by a new attribute such as geo-location, for example.

When bypassing the instant indexing mechanism for a set of documents, the documents are processed by tokenizer 322 and the extracted tokens stored in token store 324 as is done with documents that are not bypassing the instant indexing mechanism. However, unlike with a "non-bypass" document that is not bypassing the instant indexing mechanism, when tokenizer 322 processes a new version of a "bypass" document designated for bypassing the instant indexing mechanism, tokenizer 322 may notify instant indexer server 910 that bypass is enabled for the document version. For example, the changed document message added to message queue 915 may indicate that the document version is a bypass document. Such indication may be made with a designated data field or flag in the changed document message. The designation of whether a document version is a bypass document version or a non-bypass document version can be provided along with the document to tokenizer 322. For example, metadata may accompany a changed document specifying whether the version of the changed document is a bypass document version or a non-bypass document version.

Upon de-queuing a changed document message for a bypass document from message queue 915, instant indexer 910 may generate index mutation 352 and store the generated index mutation 352 in index mutation journal 930 as instant indexer 910 does when instant indexer 910 de-queues a changed document message for a non-bypass document. However, the index mutation 352 generated for the change to the bypass document may be marked as bypass. For example, an index mutation journal entry (e.g., 931A) can have a bit flag or comprise other data that indicates that index mutation 352 of the entry is for a bypass document. When an index server (e.g., 430A) requests new index mutations 352 from index mutation server 920, index mutation server 920 will not send the index server any index mutations 352 marked in index mutation journal 930 as bypass. In this way, the index server is not overwhelmed with index mutations 352 generated by instant indexer 910 for bypass documents.

While in some embodiments, index mutations 352 marked as bypass are stored in the index mutation journal 930 as such, index mutations 352 marked as bypass are not stored in the index mutation journal 930 in other embodiments. For example, the index mutation journal may store only non-bypass index mutations 352 and instant indexer 910 may discard index mutations 352 marked as bypass without storing the bypass index mutations in the index mutation journal 930.

Since the instant indexing mechanism is bypassed for a bypass document, changes to the bypass document may not be indexed in document index 328 until after the next build of the static index for the document namespace group to which the bypass document belongs.

Once a bypass document has been indexed in a static index, it may no longer be considered a bypass document and may be considered a non-bypass document. That is, subsequent changes to the document may be processed by the instant indexing mechanism and provided as index mutations 352 to an index server (e.g., 430B) for application to the indexer server's delta index for the document namespace group.

In some embodiments, it may still be useful to notify instant indexer 910 of changes to bypass documents even though such changes are not provided as index mutations 352 to index servers 430. It may still be useful to do this in order for instant indexer 910 to perform various bookkeeping steps on data stored in token store 324. For example, instant indexer 910 may be configured to delete stale document version data in token store 324. However, an implementation in which tokenizer 322 does not notify instant indexer 910 of changes to bypass documents is also possible.

By including a bypass mechanism in build system 321, build system 321 can index a set of documents in bulk without significantly impacting the performance of indexing changes to other documents. For example, build system 321 can bypass instant indexing mechanism for a large set of "bypass" documents that were recently created by a user but at the same time through the instant indexing mechanism make a change to a "non-bypass" document searchable within minutes after the change.

Turning now to FIG. 13A, it is a block diagram of a changed document message 1302, according to some embodiments of the present invention. Changed document message may be sent by tokenizer 322 to instant indexer 910 after tokenizer 322 tokenizes and generates a set of tokens for a changed document and stores the generated set of tokens in token store 324. For example, tokenizer 322 may add changed document message 1302 to the tail (end) of message queue 915 after processing the changed document.

Change document message 1302 includes document identifier 1304, document namespace group identifier 1306, document version identifier 1308, and bypass flag 1310. Document identifier 1304 is an identifier of the changed document. Document namespace group identifier 1306 is an identifier of the document namespace group which contains the document namespace to which the changed document belongs. In some embodiments, in addition to or instead of document namespace group identifier 1306, changed document message 1302 includes a document namespace identifier of the document namespace. Document version identifier 1308 identifies a version of the changed document. Bypass flag 1310 indicates whether the version of the changed document is designated to bypass the instant indexing mechanism (i.e., a bypass document version) or not designated to bypass the instant indexing mechanism (i.e., a non-bypass document version). For example, bypass flag 1310 may be a bit value or other data value that indicates whether the version of the changed document is a bypass document version or a non-bypass document version. If the changed document version is a bypass document version, then an index mutation 352 generated by instant indexer 910 for the changed document version will not be provided by index mutation server 920 from index mutation journal 930 to a polling index server (e.g., 430C). However, if the changed document version is a non-bypass document version, then an index mutation 352 generated by instant indexer 910 for the changed document version may be provided to the polling index server (e.g., 430C).

Turning now to FIG. 13B, it is a block diagram of an index mutation journal entry (e.g., 931A), according to some embodiments of the present invention. As shown, an index mutation journal entry may comprise a journal timestamp 932 as described above, a bypass flag 1312, and an index mutation 352 as described above.

Bypass flag 1312 indicates whether the index mutation of the journal entry is designated for bypass (i.e., a bypass index mutation) or not designated for bypass (i.e., a non-bypass index mutation). For example, bypass flag 1312 may be a bit value or other data value that indicates whether the index mutation 352 is a bypass index mutation or a non-bypass index mutation. If the index mutation 352 of the journal entry is a bypass index mutation, then the index mutation 352 will not be provided by index mutation server 920 to a polling index server (e.g., 430C). However, if the index mutation 352 of the journal entry is a non-bypass index mutation, then the index mutation 352 may be provided to the polling index server (e.g., 430C).

In some embodiments, index mutation 352 of a journal entry includes a document identifier of the document to which the index mutation 352 pertains, a set of tokens to use to index the document, and a set of tokens to no longer use to index the document. In some embodiments, the index mutation 352 includes only a set of tokens to use to index the document and does not include a set of tokens to no longer use to index the document. In some embodiments, the index mutation 352 includes only a set of tokens to no longer use to index the document and does not include a set of tokens to use to index the document. In some embodiments, the index mutation 352 also includes a document namespace group identifier of the document namespace group that contains the document namespace to which the document belongs. In some embodiments, in addition to or instead of the document namespace group identifier, the index mutation 352 also includes a document namespace identifier of the document namespace.

Extensions and Alternatives

While the invention is described in some detail with specific reference to a single-preferred embodiment and certain alternatives, there is no intent to limit the invention to that particular embodiment or those specific alternatives. Therefore, those skilled in the art will appreciate that modifications may be made to the preferred embodiment without departing from the teachings of the present invention.

The invention claimed is:

1. A method for incrementally updating a multi-user document index distributed over a plurality of index servers, the method performed by one or more computing devices, the method comprising:
generating an index mutation comprising one or more tokens, wherein the index mutation is based at least in part on one or more identified differences between a new version of a document and a previous version of the document;
appending the index mutation and an associated time-based value to a log;
reading the time-based value associated with the index mutation from the log and comparing the associated time-based value to a time-based value associated with an index of the document, the index of the document stored at an index server of the plurality of index servers;
wherein the time-based value associated with the index of the document stored at the index server represents a last-update time of the index of the document stored at the index server;
based at least in part on the reading and the comparing, providing the one or more tokens of the index mutation read from the log to the index server at which the index of the document is stored; and
wherein the providing the one or more tokens to the index server causes the index server to use the one or more tokens to update the index of the document stored at the index server.

2. The method of claim 1, wherein at least one of the one or more tokens is identified in the new version of the document but not the previous version of the document.

3. The method of claim 1, wherein at least one of the one or more tokens is identified in the previous version of the document but not the new version of the document.

4. The method of claim 1, further comprising storing the index mutation and the associated time-based value in an append-only log.

5. The method of claim 1, wherein providing the one or more tokens of the index mutation causes the index server to update the index of the document stored at the index server based at least in part on the one or more tokens.

6. The method of claim 1, wherein the time-based value associated with the index mutation is a timestamp.

7. The method of claim 1, further comprising receiving the time-based value associated with the index of the document stored at the index server from the index server.

8. The method of claim 1, wherein the providing the one or more tokens of the index mutation to the index server is based, at least in part, on the index mutation corresponding to a document namespace assigned to the index server.

9. The method of claim 1,
wherein the document belongs to a document namespace assigned to the index server;
wherein the index mutation comprises an identifier of the document namespace; and
wherein the providing the one or more tokens of the index mutation to the index server is based, at least in part, on the identifier of the document namespace of the index mutation.

10. The method of claim 1,
wherein a result of the comparing indicates whether the index server is up-to-date with respect to the index mutation; and wherein the providing the one or more tokens of the index mutation to the index server is based at least in part on the result of the comparing.

11. The method of claim 1, wherein the other index mutation comprises tokens representing information on another document that is different than the document.

12. The method of claim 1, further comprising:
identifying the new version of the document based on information on the document from a message queue;
wherein the message queue stores information on changes to one or more documents managed by a content management system; and
wherein generating the index mutation is in response to the identifying the new version of the document.

13. The method of claim 1, wherein the index mutation is a first index mutation; wherein the document is a first document; and wherein the method further comprises:
generating a second index mutation that is not the first index mutation, the second index mutation comprising at least one token, wherein the second index mutation is based at least in part on at least one identified difference between a new version of a second document that is not the first document and a previous version of the second document;
storing the second index mutation and an associated bypass flag value; and
based at least in part on the bypass flag value, determining not to provide the at least one token of the second index mutation to an index server.

14. One or more non-transitory computer-readable media storing instructions which, when executed by one or more computing devices, cause performance of operations for incrementally updating a multi-user document index distributed over a plurality of index servers, the operations comprising:
generating an index mutation comprising one or more tokens, wherein the index mutation is based on identified differences between a new version of a document and a previous version of the document;
wherein an index of the document is stored at an index server of the plurality of index servers;
appending an indication of the index mutation and an associated time-based value to a log;
reading the time-based value associated with the indication of the index mutation from the log and comparing the associated time-based value to a time-based value associated with the index of the document stored at the index server;
wherein the time-based value associated with the index of the document stored at the index server represents a last-update time of the index of the document stored at the index server; and
based at least in part on comparing the time-based value associated with the indication of the index mutation that was read from the log and the time-based value associated with the index of the document stored at the index server, providing the one or more tokens from the appended index mutation indication to the index server that stores the index of the document stored at the index server, wherein the providing causes the index server to use the one or more tokens to update the index of the document stored at the index server.

15. The one or more non-transitory computer-readable media storing instructions of claim 14, wherein the previous version of the document does not include at least one token used to represent the new version of the document.

16. The one or more non-transitory computer-readable media storing instructions of claim 14, wherein the log is an append-only log.

17. A system for incrementally updating a multi-user document index distributed over a plurality of index servers, the system comprising:
storage media;
one or more processors; and
instructions stored in the storage media and configured for execution by the one or more processors, the instructions configured for:
generating an index mutation comprising one or more tokens, wherein the one or more tokens are based at least in part on identified differences between a new version of a document and a previous version of the document;
appending the index mutation and a version indicator to a log;
reading the version indicator associated with the index mutation from the log and comparing the associated version indicator to a value associated with an index of the document, the index of the document stored at an index server of the plurality of index servers; and
wherein the value associated with the index of the document stored at the index server represents a latest-updated version of the index;
based at least in part on the reading and the comparing, providing the one or more tokens of the index mutation from the log to the index server; and
wherein the providing the one or more tokens to the index server causes the index server to use the one or more tokens to update the index of the document stored at the index server.

18. The system of claim 17, wherein at least one of the one or more tokens is identified in the new version of the document but not the previous version of the document.

19. The system of claim 17, wherein the version indicator is a clock value.

20. The system of claim 17, further comprising storing the index mutation and the associated version indicator in an append-only log.

* * * * *